US012676521B2

(12) United States Patent
Lai et al.

(10) Patent No.: US 12,676,521 B2
(45) Date of Patent: Jul. 7, 2026

(54) VARIABLE FLUX PERMANENT-MAGNET SYNCHRONOUS MOTOR

(71) Applicant: Huawei Digital Power Technologies Co., Ltd., Shenzhen (CN)

(72) Inventors: Bin Lai, Dongguan (CN); Yu Wang, Shenzhen (CN); Zijing Wang, Dongguan (CN); Huanwen Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 18/395,645

(22) Filed: Dec. 25, 2023

(65) Prior Publication Data

US 2024/0128816 A1     Apr. 18, 2024

Related U.S. Application Data

(63) Continuation of application No. PCT/CN2021/122850, filed on Oct. 9, 2021.

(51) Int. Cl.
| | |
|---|---|
| *H02K 1/27* | (2022.01) |
| *H02K 1/276* | (2022.01) |
| *H02K 11/25* | (2016.01) |
| *H02K 21/14* | (2006.01) |

(52) U.S. Cl.
CPC ........... *H02K 1/2766* (2013.01); *H02K 11/25* (2016.01); *H02K 21/14* (2013.01)

(58) Field of Classification Search
CPC ...... H02K 1/2766; H02K 11/25; H02K 21/14; H02K 1/279; H02K 2213/03; H02K 2213/09
See application file for complete search history.

(56) References Cited

U.S. PATENT DOCUMENTS

| | | | |
|---|---|---|---|
| 2013/0249340 A1* | 9/2013 | Potoradi ................ | H02K 21/02 310/156.01 |
| 2015/0171679 A1* | 6/2015 | Nishiyama ........... | H02K 1/2766 310/156.07 |
| 2017/0098496 A1* | 4/2017 | Sun ........................... | B22F 3/16 |
| 2019/0207492 A1* | 7/2019 | Lin ......................... | H02P 31/00 |

(Continued)

FOREIGN PATENT DOCUMENTS

| | | |
|---|---|---|
| CN | 101232205 A | 7/2008 |
| CN | 104467334 A | 3/2015 |
| CN | 108933509 A | 12/2018 |

(Continued)

*Primary Examiner* — Thomas Truong

(57) ABSTRACT

A variable flux permanent-magnet synchronous motor, a powertrain, and a fan are disclosed, which are applied to the field of motors. The variable flux permanent-magnet synchronous motor includes a stator system 10, a rotor system 20, and a variable magnet system 30. The variable magnet system 30 is located in the stator system 10 or the rotor system 20. The rotor system 20 includes a first permanent magnet 201. The variable magnet system 30 includes a second permanent magnet 301 and a heating apparatus 302. Coercive force of the second permanent magnet 301 is lower than coercive force of the first permanent magnet 201. The heating apparatus 302 is configured to heat the second permanent magnet 301, so that the second permanent magnet 301 has variable flux in a magnetic field.

16 Claims, 11 Drawing Sheets

(56) References Cited

U.S. PATENT DOCUMENTS

2022/0185120 A1 *  6/2022  Liu  ......................... H02P 21/14

FOREIGN PATENT DOCUMENTS

| | | | |
|---|---|---|---|
| CN | 210246428 U | | 4/2020 |
| CN | 113014009 A | | 6/2021 |
| JP | 2000139047 A | * | 5/2000 |
| JP | 2000306727 A | | 11/2000 |
| JP | 2006280195 A | | 10/2006 |
| WO | 2008023413 A1 | | 2/2008 |

* cited by examiner

VARIABLE FLUX PERMANENT-MAGNET SYNCHRONOUS MOTOR

CROSS-REFERENCE TO RELATED APPLICATIONS

This application is a continuation of International Application No. PCT/CN2021/122850, filed on Oct. 9, 2021, the disclosure of which is hereby incorporated by reference in its entirety.

TECHNICAL FIELD

Embodiments of this application relate to the field of motors, and in particular, to a variable flux permanent-magnet synchronous motor, a powertrain, and a fan.

BACKGROUND

A permanent-magnet synchronous motor has advantages such as a small volume, high efficiency, flexible design, a simple structure, and easy maintenance. The permanent-magnet synchronous motor is widely used in fields such as aerospace, wind power generation, servo systems, rail transport, electric vehicles, and heating and ventilation. After entering a high-speed stage, the permanent-magnet synchronous motor needs to continuously perform weak magnetic control. Usually, a large weak magnetic current is used to reduce a terminal voltage of the motor during operation. A weak magnetic capability of the motor is limited, that is, a problem of high-speed weak magnetic exists.

There is a variable flux permanent-magnet synchronous motor (VF-PMSM), and the variable flux permanent-magnet synchronous motor may be referred to as a variable flux motor for short, to resolve the problem of high-speed weak magnetism of the permanent-magnet synchronous motor. This kind of motor does not need to apply an additional weak magnetic current during high-speed operation. Therefore, the motor can have high efficiency in a large speed range.

The variable flux permanent-magnet synchronous motor needs to change a magnetization degree of a permanent magnet to adjust a magnetic field, and a magnetization degree of a permanent magnetic material with high coercive force is difficult to change. Therefore, only a permanent magnetic material with low coercive force can be used as a variable flux magnet, such as an aluminum-nickel-cobalt (AlNiCo) permanent magnet. The variable flux permanent-magnet synchronous motor has problems that it is difficult to perform flux adjustment on the permanent magnetic material with high coercive force and there are few permanent magnetic materials that can be selected as the variable flux magnet.

SUMMARY

Embodiments of this application provide a variable flux permanent-magnet synchronous motor, a powertrain, and a fan, to reduce flux adjustment difficulty and expand a range of permanent magnetic materials that can be selected as a variable flux magnet.

To resolve the foregoing technical problem, embodiments of this application provide the following technical solutions.

According to a first aspect, an embodiment of this application provides a variable flux permanent-magnet synchronous motor. The variable flux permanent-magnet synchronous motor includes a stator system 10, a rotor system 20, and a variable magnet system 30. The variable magnet system 30 is located in the stator system 10 or the rotor system 20. The rotor system 20 includes a first permanent magnet 201. The variable magnet system 30 includes a second permanent magnet 301 and a heating apparatus 302. Coercive force of the second permanent magnet 301 is lower than coercive force of the first permanent magnet 201. The heating apparatus 302 is configured to heat the second permanent magnet 301, so that the second permanent magnet 301 has variable flux in a magnetic field.

In the foregoing solution, in the variable flux permanent-magnet synchronous motor, the rotor system 20 includes the first permanent magnet 201, and the variable magnet system 30 includes the second permanent magnet 301. The two permanent magnets have different coercive force, and the second permanent magnet 301 is heated by using the heating apparatus 302. The heating apparatus 302 may assist the second permanent magnet 301 in implementing the variable flux in the magnetic field. In the variable flux permanent-magnet synchronous motor, the heating apparatus 302 heats the second permanent magnet 301, so that a temperature of the second permanent magnet 301 rises. This can reduce flux adjustment difficulty of the second permanent magnet 301 and expand a range of permanent magnetic materials that can be selected as a variable flux magnet.

In a possible implementation, a quantity of second permanent magnets 301 is the same as a quantity of heating apparatuses 302, and the second permanent magnets 301 one-to-one correspond to the heating apparatuses 302. In the foregoing solution, for example, the quantity of second permanent magnets 301 included in the variable flux permanent-magnet synchronous motor is M, the quantity of heating apparatuses 302 included in the variable flux permanent-magnet synchronous motor is M, and a value of M is a positive integer. The quantity of second permanent magnets 301 is equal to the quantity of heating apparatuses 302, and the second permanent magnets 301 one-to-one correspond to the heating apparatuses 302, so that a corresponding heating apparatus 302 is disposed in each second permanent magnet 301, to adjust the temperature of the second permanent magnet 301. When there are a plurality of heating apparatuses 302, all the heating apparatuses 302 may be used for heating, or only some of the heating apparatuses 302 may be used for heating, which is determined with reference to an application scenario. Therefore, flexible temperature control for the M second permanent magnets 301 can be implemented.

In a possible implementation, a controller is further included. The controller is configured to control a temperature that the heating apparatus 302 needs to reach and time required to reach the temperature. In the foregoing solution, the variable flux permanent-magnet synchronous motor further includes the controller. The controller may control the heating apparatus 302. For example, the controller may control a heating temperature and heating time, so that the second permanent magnet 301 can reach the temperature within the time, to implement heating control of the second permanent magnet 301.

In a possible implementation, the controller is configured to input a current to the heating apparatus within the time, so that the heating apparatus reaches the temperature within the time. In the foregoing solution, a temperature of the second permanent magnet 301 is adjusted by controlling the current of the heating apparatus 302. For the heating time of the heating apparatus 302, because the second permanent magnet 301 has a small size and a small specific heat capacity, heat required for a temperature rise is not large, and time for the temperature rise is short, usually less than 10 s. In addition, because the permanent magnet often has a specific initial temperature, the time for the temperature rise can be shorter.

In a possible implementation, the rotor system 20 further includes a rotor iron core 202, the first permanent magnet 201 is located on the rotor iron core 202, and the second permanent magnet 301 and the heating apparatus 302 are both located on the rotor iron core 202. In the foregoing solution, the rotor system 20 may include the rotor iron core 202 and the first permanent magnet 201 located on the rotor iron core 202. The second permanent magnet 301 has the variable flux in the magnetic field when being heated. In this embodiment of this application, the second permanent magnet 301 and the heating apparatus 302 are both located on the rotor iron core 202. Therefore, the second permanent magnet 301 implements the variable flux by using the heating apparatus 302. Therefore, the heating apparatus 302 is disposed in the variable flux permanent-magnet synchronous motor, to assist the second permanent magnet 301 in implementing the variable flux. This reduces flux adjustment difficulty and expands a range of permanent magnetic materials that can be selected as a variable flux magnet.

In a possible implementation, the heating apparatus 302 includes a heating plate 302, a U-shaped cavity is disposed on the rotor iron core 202, the U-shaped cavity includes a wing part 2021 and a bottom part 2022, the first permanent magnet 201 is located at the wing part 2021, the second permanent magnet 301 is located at the bottom part 2022, and the heating plate 302 is located on a side that is of the second permanent magnet 301 and that is close to an opening of the U-shaped cavity. In the foregoing solution, the heating apparatus 302 has a plurality of shapes. For example, the heating apparatus is the heating plate 302, the second permanent magnet 301 and the heating apparatus 302 are both located on the rotor iron core 202, and the first permanent magnet 201 and the second permanent magnet 301 are located at different ends of the U-shaped cavity. The flux starts from one pole (for example, a north pole) of the first permanent magnet 201 of the U-shaped cavity, passes through the rotor iron core 202, directly reaches the other pole (for example, a south pole) of the second permanent magnet 301, then passes through a yoke part of the rotor iron core 202, and returns to the other pole (for example, a south pole) of the first permanent magnet 201. A local magnetic loop is formed, so that most of the flux forms a short circuit inside the rotor system.

In a possible implementation, the rotor system 20 further includes a rotor iron core 202, the first permanent magnet 201 is located on the rotor iron core 202, the stator system 10 includes a stator iron core 101, and the second permanent magnet 301 and the heating apparatus 302 are both located on the stator iron core 101. In the foregoing solution, the rotor system 20 may include the rotor iron core 202 and the first permanent magnet 201 located on the rotor iron core 202. The second permanent magnet 301 has the variable flux in the magnetic field when being heated. In this embodiment of this application, the second permanent magnet 301 and the heating apparatus 302 are both located on the stator iron core 101. Therefore, the second permanent magnet 301 implements the variable flux by using the heating apparatus 302. Therefore, the heating apparatus 302 is disposed in the variable flux permanent-magnet synchronous motor, to assist the second permanent magnet 301 in implementing the variable flux. This reduces flux adjustment difficulty and expands a range of permanent magnetic materials that can be selected as a variable flux magnet.

In a possible implementation, the heating apparatus 302 includes a heating plate 302; a U-shaped cavity is disposed on the rotor iron core 202, and the first permanent magnet 201 is located in the U-shaped cavity; the stator iron core 101 includes an outer stator yoke 1013, the outer stator yoke 1013 includes an inner slot 10131, and the second permanent magnet 301 is located in the inner slot 10131; and an inner surface of the second permanent magnet 301 has a gap, the heating plate 302 is located in the gap, and the heating plate 302 is in contact with the second permanent magnet 301. In the foregoing solution, the heating apparatus 302 has a plurality of shapes. For example, the heating apparatus is the heating plate 302, the second permanent magnet 301 and the heating apparatus 302 are both located on the inner slot of the stator iron core 101, and the first permanent magnet 201 is located in the U-shaped cavity of the rotor iron core 202. Most of the permanent magnetic flux starts from one pole (for example, a north pole) of the second permanent magnet 301, passes through the rotor iron core 202 to reach the other pole (for example, a south pole) of the first permanent magnet 201 of the U-shaped cavity, then starts from one pole (for example, a north pole) of the first permanent magnet 201 of the U-shaped cavity, passes through a yoke part of the rotor iron core 202, passes through the first permanent magnet 201 of an adjacent U-shaped cavity, passes through the rotor iron core 202 to a stator tooth part 1014 of the rotor iron core 202, passes through the stator iron core 101 to reach the other pole (for example, a south pole) of an adjacent second permanent magnet 301 with an opposite orientation, and passes through the stator iron core 101 to reach the other pole (for example, a south pole) of the second permanent magnet 301 from which the flux starts, thereby implementing a magnetic loop. A small part of the flux of the second permanent magnet 301 is inside the stator iron core 101, and flux of the first permanent magnet 201 is inside the rotor iron core 202, to form a local magnetic loop.

In a possible implementation, the stator system 10 further includes a stator iron core 101 and an armature winding 102; the armature winding 102 is located on the stator iron core 101; and the flux of the second permanent magnet 301 is adjusted based on a magnetic field generated by a D-axis current, where duration for which the D-axis current is applied to the armature winding 102 is less than a preset duration threshold. In the foregoing solution, variable flux of the second permanent magnet 301 may be implemented in a plurality of manners. For example, forward or reverse variable flux is generated by using a direct-axis (that is, the D-axis) current on the stator system 10. The applied duration of the D-axis current is less than the preset duration threshold. A value of the duration threshold is not limited. For example, the duration of the D-axis current may be referred to as short duration. When the variable magnet system 30 is located on the rotor system 20, the short-duration D-axis current may be applied to the armature winding 102 to perform magnetization enhancement or magnetization weakening processing on the second permanent magnet 301 in a high-temperature state, thereby adjusting the flux of the second permanent magnet 301.

In a possible implementation, an electrical brush 60 and a power supply 70 are further included. The rotor system 20 further includes a collector ring 204; an end part of the rotor iron core 202 is connected to the collector ring 204, and the collector ring 204 is connected to the power supply 70 through the electrical brush 60; the heating apparatus 302 includes a conducting wire connector, and the conducting wire connector is connected to the collector ring 204; and the power supply 70 outputs a current to the heating apparatus 302 through the electrical brush 60 and the collector ring 204, so that the heating apparatus 302 heats the second permanent magnet 301. In the foregoing solution, the variable magnet system 30 includes the second permanent magnet 301 and the heating apparatus 302, and the second permanent magnet 301 and the heating apparatus 302 are both located on the rotor iron core 202. A current transmission manner of the heating apparatus 302 may be energy input through the electrical brush 60. A specific structure is as follows: The conducting wire connector of the heating apparatus 302 is connected to the collector ring 204 at the end part of the rotor iron core 202, the collector ring 204 is connected to an external power supply through the electrical brush 60, and when the power supply 70 is turned on, the current sends the energy to the heating apparatus 302 through the electrical brush 60 and the collector ring 204, so that the heating apparatus 302 can supply power to the second permanent magnet 301.

In a possible implementation, a power supply 70 and a rotating transformer 80 are further included. The rotating transformer 80 includes a rotor winding 801 and a stator winding 802; an end part of the rotor iron core 202 is connected to the rotor winding 801, and the stator winding 802 is connected to the power supply 70; the heating apparatus 302 includes a conducting wire connector, and the conducting wire connector is connected to the rotor winding 801; and the power supply 70 outputs a current to the heating apparatus 302 by using the rotating transformer 80, so that the heating apparatus 302 heats the second permanent magnet 301. In the foregoing solution, the variable magnet system 30 includes the second permanent magnet 301 and the heating apparatus 302, and the second permanent magnet 301 and the heating apparatus 302 are both located on the rotor iron core 202. A current transmission manner of the heating apparatus 302 may be energy input in a manner similar to wireless excitation. A specific structure is as follows: The conducting wire connector of the heating apparatus 302 is connected to the rotor winding of the rotating transformer at the end part of the rotor iron core 202, the stator winding of the rotating transformer is connected to an external power supply, and when the power supply 70 is turned on, the current sends the energy to the heating apparatus 302 through the rotating transformer, so that the heating apparatus 302 can supply power to the second permanent magnet 301.

In a possible implementation, the variable magnet system 30 further includes a single-phase pulse winding 303; the single-phase pulse winding 303 is located in the inner slot 10131, and the single-phase pulse winding 303 is adjacent to the second permanent magnet 301; and the flux of the second permanent magnet 301 is adjusted based on a magnetic field generated by a current applied to the single-phase pulse winding 303. In the foregoing solution, variable flux of the second permanent magnet 301 may be implemented in a plurality of manners. For example, a single-phase pulse winding 303 is added to the stator system 10 to generate variable flux. When the variable magnet system 30 is located on the stator system 10, a single-phase pulse winding 303 may be added to the stator system 10, and the single-phase pulse winding 303 may also be referred to as a pulse flux adjustment winding. The single-phase pulse winding 303 may be formed by connecting newly added armature windings 102 of three phases head to tail in series, or may be formed by connecting the armature windings 102 in the stator system 10 head to tail in series. Flux adjustment is performed on the second permanent magnet 301 at a high temperature by using the single-phase pulse winding 303.

In a possible implementation, a power supply 70 is further included. The heating apparatus 302 includes a conducting wire connector, and the conducting wire connector is connected to the power supply 70; and the power supply 70 outputs a current to the heating apparatus 302, so that the heating apparatus 302 heats the second permanent magnet 301. In the foregoing solution, the variable magnet system 30 includes the second permanent magnet 301 and the heating apparatus 302, and the second permanent magnet 301 and the heating apparatus 302 are both located on the stator iron core 101. A current transmission manner of the heating apparatus 302 may be energy input through the conducting wire of the heating apparatus 302. A specific structure is as follows: The variable magnet system 30 may also be disposed on the stator iron core 101. Because the stator system 10 is in a static state, when the variable magnet system 30 is located on the stator system 10, the conducting wire of the heating apparatus 302 may be directly connected to an external power supply, and when the power supply 70 is turned on, the current is sent to the heating apparatus 302 through the conducting wire, so that the heating apparatus 302 can supply power to the second permanent magnet 301.

In a possible implementation, a coercive force temperature coefficient of the second permanent magnet 301 is greater than or equal to −0.5%/K; when a temperature of the second permanent magnet 301 is greater than or equal to a highest operating temperature of the variable flux permanent-magnet synchronous motor, the coercive force of the second permanent magnet 301 is greater than or equal to 150 kA/m and less than or equal to 300 kA/m; and K indicates Kelvin temperature and kA/m indicates kiloamperes per meter. In the foregoing solution, the coercive force of the second permanent magnet 301 is lower than the coercive force of the first permanent magnet 201, and has flux that varies in a magnetic field at a high temperature when a preset current is applied to the armature winding 102. Compared with the second permanent magnet 301, the first permanent magnet 201 is a fixed magnet, and flux of the first permanent magnet 201 may change with a temperature rise of the motor. However, the first permanent magnet 201 has the high coercive force even at the high temperature, and the flux does not change due to a change of an external magnetic field. The second permanent magnet 301 is a variable flux magnet. To adjust the flux of the second permanent magnet 301, the coercive force of the second permanent magnet 301 at the high temperature is only 150 kA/m to 300 kA/m. A specific temperature varies with working conditions of different types of motors. This is not limited herein.

In a possible implementation, the second permanent magnet 301 is a neodymium-iron-boron NdFeB permanent magnet. In the foregoing solution, coercive force of the neodymium-iron-boron permanent magnet is high, and it is too difficult to perform flux adjustment on the neodymium-iron-boron permanent magnet. In this embodiment of this application, the heating apparatus 302 performs the flux adjustment on the neodymium-iron-boron permanent magnet, so that the neodymium-iron-boron permanent magnet is suitable for becoming a variable flux magnet. According to the motor structure provided in this embodiment of this application, difficulty in adjusting the flux of the magnet is reduced, and a material selection range of the variable flux magnet is greatly expanded, so that the neodymium-iron-boron permanent magnetic material can also be applied to the variable magnet of the variable flux motor. The neodymium-iron-boron permanent magnet has a high remanence. Therefore, use of the neodymium-iron-boron permanent magnet greatly increases a range of speed adjustment while ensuring a torque density of the variable flux motor.

In a possible implementation, the second permanent magnet 301 has a main alloy composition of $(Nd_{1-a}RE_a)_xFe_{bal}B_yM_z$; and RE indicates a rare earth element, Nd indicates neodymium, Fe indicates Ferrum, B indicates boron, RE is one or more of lanthanum La, cerium Ce, yttrium Y, praseodymium Pr, holmium Ho, and gadolinium Gd, M is one or more of cobalt Co, cuprum Cu, niobium Nb, gallium Ga, aluminum Al, zinc Zn, nickel Ni, silicon Si, zirconium Zr, molybdenum Mo, vanadium V, and titanium Ti, a ranges from 0 to 1, x ranges from 15 wt % to 35 wt %, y ranges from 0.8 wt % to 1.2 wt %, z ranges from 0 wt % to 5 wt %, bal indicates a percentage by weight in which a remaining composition is Ferrum Fe, and wt % indicates a percentage by weight. In the foregoing solution, by setting rich rare earth elements, coercive force of the neodymium-iron-boron magnet can be reduced, difficulty in adjusting the flux can be reduced, and costs of the second permanent magnet 301 can be reduced.

In a possible implementation, the second permanent magnet 301 is a sintered neodymium-iron-boron permanent magnet, or the second permanent magnet 301 is a bonded neodymium-iron-boron permanent magnet made by pressing or injection molding after neodymium-iron-boron magnetic powder and a bonding agent are mixed. In the foregoing solution, the second permanent magnet 301 may be the sintered neodymium-iron-boron permanent magnet, or may be the bonded neodymium-iron-boron permanent magnet made by the pressing or injection molding after the neodymium-iron-boron magnetic powder and the bonding agent are mixed. The neodymium-iron-boron permanent magnet may be obtained by using the foregoing different manufacturing processes. A specific implementation is not limited herein.

In a possible implementation, the heating apparatus 302 includes at least one of the following: a heating plate, a heating wire, or a heating film. In the foregoing solution, a specific shape of the heating apparatus 302 has a plurality of implementations, which is not limited and needs to be determined with reference to a specific application scenario of the motor.

In a possible implementation, a temperature at which the heating apparatus 302 is operable exceeds 200° C., and heating power of the heating apparatus 302 is greater than 1.5 w/cm 2; and ° C. indicates degree Celsius and w/cm² indicates power per unit area. In the foregoing solution, the temperature at which the heating apparatus 302 is operable needs to exceed an operating temperature of the variable flux permanent-magnet synchronous motor, to prevent damage of the heating apparatus 302 during operation of the variable flux permanent-magnet synchronous motor. For example, the operating temperature of the variable flux permanent-magnet synchronous motor ranges from 150° C. to 200° C., and the temperature at which the heating apparatus 302 is operable exceeds 200° C. Therefore, the damage of the heating apparatus 302 due to the operating temperature of the motor can be avoided. In addition, the heating apparatus 302 needs to quickly heat the second permanent magnet 301. Therefore, the heating power of the heating apparatus 302 is greater than 1.5 w/cm², so that the heating apparatus 302 can quickly heat the second permanent magnet 301. For example, the heating apparatus 302 may complete heating of the second permanent magnet 301 within 10 seconds, and heating efficiency of the second permanent magnet 301 can be improved by using the heating apparatus 302.

In a possible implementation, a thickness of the heating apparatus 302 is greater than or equal to 0.1 mm and less than or equal to 10 mm; and mm indicates millimeter. In the foregoing solution, the heating apparatus 302 may be configured to heat the second permanent magnet 301. To reduce impact of the heating apparatus 302 on a magnetic circuit of the motor, the thickness of the heating apparatus 302 needs to be reduced as much as possible. For example, the thickness of the heating apparatus 302 may be set to 0.1 mm to 10 mm. The thickness of the heating apparatus 302 may be flexibly set based on an actual size of the motor and an actual size of the second permanent magnet 301. This is not limited herein. The heating apparatus 302 disposed in the foregoing manner has an advantage of a small size.

In a possible implementation, a heat generation surface of the heating apparatus 302 is in contact with a surface of the second permanent magnet 301. In the foregoing solution, the heat generation surface (or referred to as a heating surface) of the heating apparatus 302 is directly in contact with the surface of the permanent magnet, thereby improving heating efficiency of the second permanent magnet 301. The heating apparatus 302 may further heat the second permanent magnet 301 in a manner in which the heat generation surface is not in contact with the surface of the second permanent magnet 301, that is, in a heat conduction manner. This is not limited.

In a possible implementation, the first permanent magnet 201 has flux that does not change due to a change of a magnetic field. In the foregoing solution, the first permanent magnet 201 is a fixed magnet, and the flux of the first permanent magnet 201 may change with a temperature rise of the motor. However, the first permanent magnet 201 has high coercive force even at a high temperature, and the flux does not change due to the change of the external magnetic field.

In a possible implementation, the first permanent magnet 201 is a permanent magnet with a single magnetic property, or the first permanent magnet 201 is a plurality of permanent magnets with different magnetic properties. In the foregoing solution, the first permanent magnet 201 may be the permanent magnet with the single magnetic property, or may be the plurality of permanent magnets with different magnetic properties, and is used to distinguish the second permanent magnet 301 on which flux adjustment needs to be performed. For example, the first permanent magnet 201 may be a neodymium-iron-boron permanent magnet of a high coercive force grade, such as UH or EH. The first permanent magnet 201 may also include a neodymium-iron-boron permanent magnet mixed with medium to high coercive force grades, for example, SH and UH. The first permanent magnet 201 may even be a mixture of different types of permanent magnets, for example, mixing of a neodymium-iron-boron permanent magnet and a samarium-cobalt permanent magnet.

According to a second aspect, an embodiment of this application further provides a powertrain. The powertrain includes a transmission, a micro control unit, and the variable flux permanent-magnet synchronous motor according to any one of the first aspect. The micro control unit is electrically connected to the transmission, and the micro control unit is electrically connected to the variable flux permanent-magnet synchronous motor.

In the second aspect of this application, the components of the powertrain may further have the composition structures described according to the first aspect and the possible implementations. For details, refer to the foregoing descriptions of the first aspect and the possible implementations.

According to a third aspect, an embodiment of this application further provides a fan. The fan includes an impeller, a micro control unit, and the variable flux permanent-magnet synchronous motor according to any one of the first aspect. The micro control unit is electrically connected to the impeller; and the micro control unit is electrically connected to the variable flux permanent-magnet synchronous motor.

In the third aspect of this application, the components of the fan may further have the composition structures described according to the first aspect and the possible implementations. For details, refer to the foregoing descriptions of the first aspect and the possible implementations.

Figure 1:
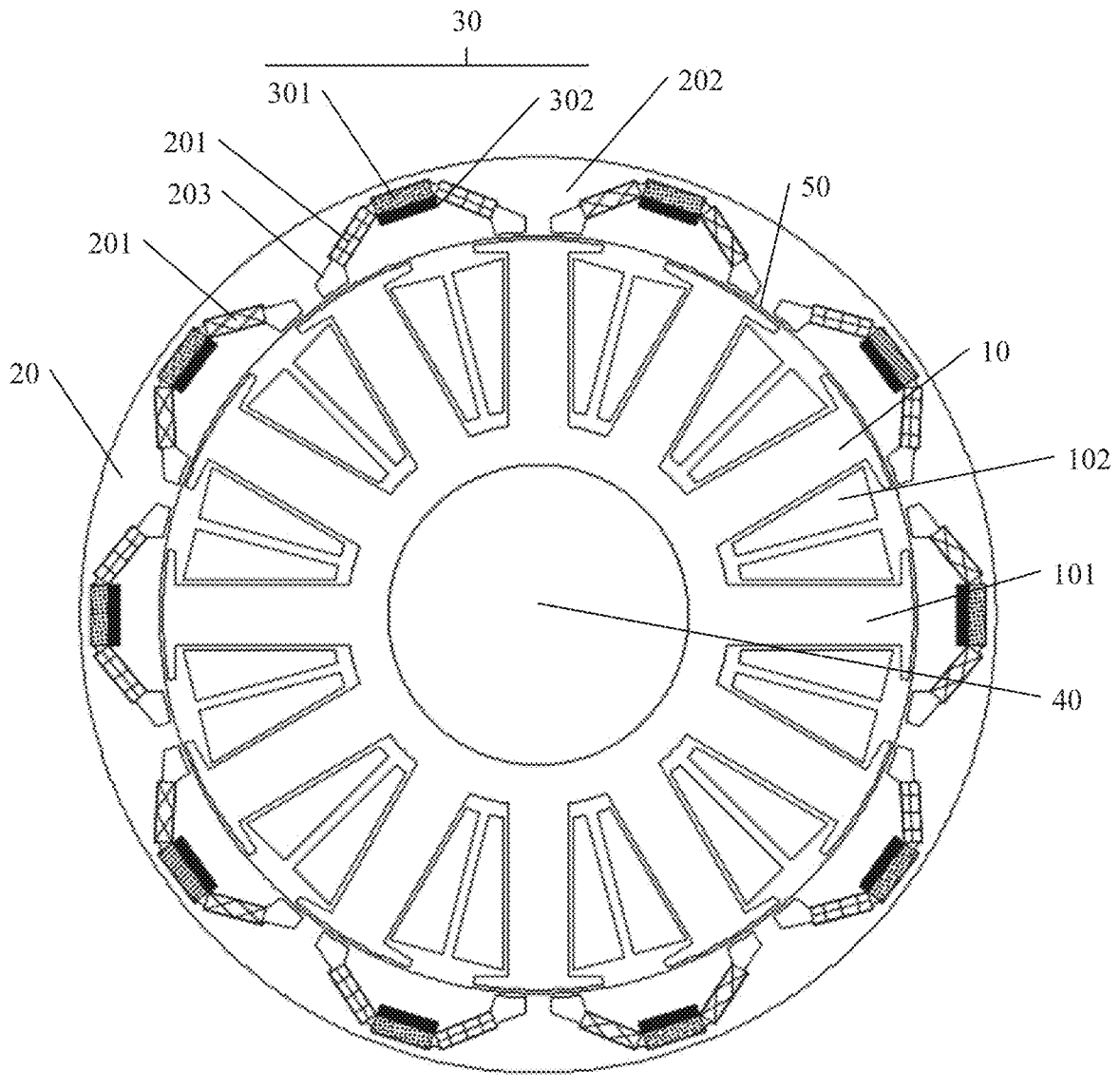
FIG. 1 is a schematic diagram of a structure of a variable flux permanent-magnet synchronous motor according to an embodiment of this application.

Reference numerals that may be used in the foregoing accompanying drawings are as follows:

A variable flux permanent-magnet synchronous motor includes a stator system 10, a rotor system 20, a variable magnet system 30, a rotating shaft system 40, an air gap 50, an electrical brush 60, a power supply 70, and a rotating transformer 80;

the stator system 10 includes a stator iron core 101 and an armature winding 102;

the stator iron core 101 includes an inner stator yoke 1011, an inner stator slot 1012, an outer stator yoke 1013, a stator tooth part 1014, and a stator slot 1015, and the outer stator yoke 1013 includes an inner slot 10131;

the rotor system 20 includes a first permanent magnet 201, a rotor iron core 202, a magnetic isolation bridge 203, and a collector ring 204;

a U-shaped cavity is disposed on the rotor iron core 202, and the U-shaped cavity includes a wing part 2021 and a bottom part 2022;

the rotor iron core 202 includes a positive conducting wire 2021, a negative conducting wire 2022, and a rotor slot 2023;

the variable magnet system 30 includes a second permanent magnet 301, a heating apparatus 302, and a single-phase pulse winding 303; and the rotating transformer 80 includes a rotor winding 801 and a stator winding 802.

DESCRIPTION OF EMBODIMENTS

Embodiments of this application provide a variable flux permanent-magnet synchronous motor, a powertrain, and a fan, to reduce flux adjustment difficulty and expand a range of permanent magnetic materials that can be selected as a variable flux magnet.

The following describes embodiments of this application with reference to accompanying drawings.

In the specification, claims, and accompanying drawings of this application, terms "first", "second", and the like are intended to distinguish between similar objects but do not necessarily indicate a specific order or sequence. It should be understood that the terms used in such a way are interchangeable in proper cases, which is merely a discrimination manner used when objects having a same attribute are described in embodiments of this application. In addition, terms "include", "have" and any other variants thereof mean to cover non-exclusive inclusion, so that a process, method, system, product, or device that includes a series of units is not necessarily limited to those units, but may include other units not expressly listed or inherent to such a process, method, system, product, or device.

Before embodiments in this application are described, some nouns mentioned in the following descriptions are first explained.

Coercive force (coercive force) means that after magnetization of a magnetic material is saturated, when an external magnetic field returns to zero, a magnetic flux density B of the magnetic material does not return to zero, and the magnetic flux density can return to zero only by adding a magnetic field with a specific magnitude to an opposite direction of an original magnetizing field. The magnetic field is referred to as a coercive magnetic field, which is also referred to as the coercive force.

Figure 9:
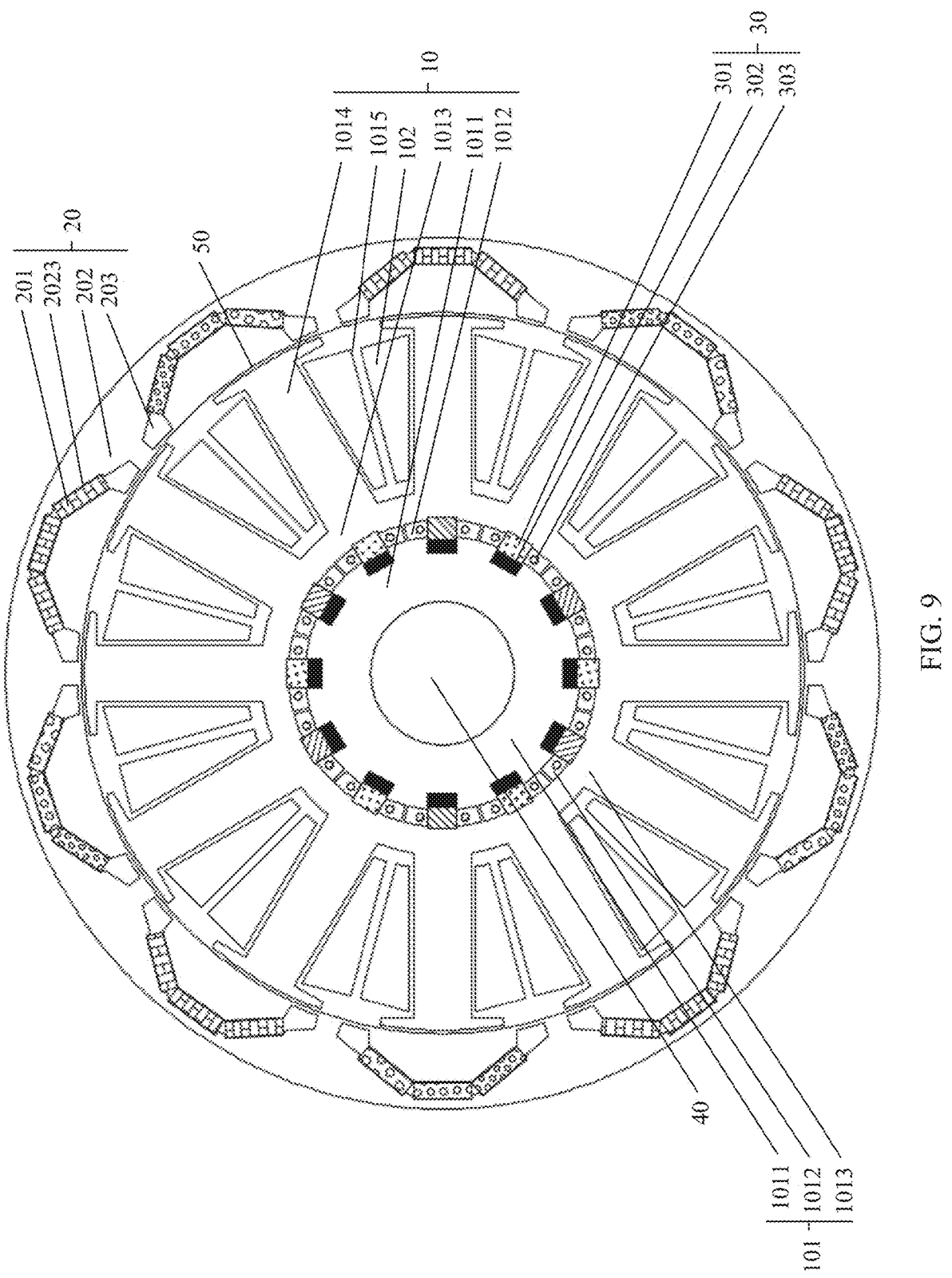
FIG. 9 is a schematic diagram of a structure of another variable flux permanent-magnet synchronous motor according to an embodiment of this application.

As shown in FIG. 1 and FIG. 9, an embodiment of this application provides a variable flux permanent-magnet synchronous motor (referred to as a motor for short). The variable flux permanent-magnet synchronous motor includes a stator system 10, a rotor system 20, and a variable magnet system 30.

The variable magnet system 30 is located in the stator system 10 or the rotor system 20.

The rotor system 20 includes a first permanent magnet 201.

The variable magnet system 30 includes a second permanent magnet 301 and a heating apparatus 302. Coercive force of the second permanent magnet 301 is lower than coercive force of the first permanent magnet 201. The heating apparatus 302 is configured to heat the second permanent magnet 301, so that the second permanent magnet 301 has variable flux in a magnetic field.

The variable flux permanent-magnet synchronous motor has two or more permanent magnets. For example, there are a plurality of permanent magnets in the variable flux permanent-magnet synchronous motor, and coercive force of the plurality of permanent magnets is different. Therefore, in this embodiment of this application, the variable flux permanent-magnet synchronous motor includes at least two permanent magnets with different coercive force. The variable flux permanent-magnet synchronous motor may also be referred to as a "hybrid permanent-magnet motor". A typical feature of the motor is that the motor has a plurality of permanent magnets with different magnetic properties, such as a permanent magnet with high coercive force and a permanent magnet with low coercive force. In the following embodiments, an example in which the variable flux permanent-magnet synchronous motor includes two permanent magnets, which are respectively the first permanent magnet 201 and the second permanent magnet 301 is used. The coercive force of the second permanent magnet 301 is lower than the coercive force of the first permanent magnet 201. In this embodiment of this application, distribution locations of the first permanent magnet 201 and the second permanent magnet 301 in the motor and a correspondence between the two permanent magnets may be flexibly set based on a composition structure of the motor. This is not limited herein. In addition to the first permanent magnet 201 and the second permanent magnet 301, the variable flux permanent-magnet synchronous motor may further include a third permanent magnet, or may further include more permanent magnets such as the third permanent magnet and a fourth permanent magnet. This is not limited herein.

The coercive force of the second permanent magnet 301 is lower than the coercive force of the first permanent magnet 201. For example, the first permanent magnet 201 may be the permanent magnet with high coercive force, and the second permanent magnet 301 may be the permanent magnet with low coercive force. It should be noted that, values of the coercive force of the first permanent magnet 201 and the coercive force of the second permanent magnet 301 are based on a specific temperature, for example, at a normal temperature. A specific value of the coercive force of the first permanent magnet 201 and a specific value of the coercive force of the second permanent magnet 301 are not limited in this embodiment of this application.

As shown in FIG. 1 and FIG. 9, the variable flux permanent-magnet synchronous motor provided in this embodiment of this application further includes the heating apparatus 302. The heating apparatus 302 may be configured to heat the second permanent magnet 301, so that a temperature of the second permanent magnet 301 rises. For example, the heating apparatus 302 may control heating power by using a current. For example, the variable flux permanent-magnet synchronous motor further includes a controller. The controller may generate a current, input the current to the heating apparatus 302, and the heating apparatus 302 may heat the second permanent magnet 301. A location of the heating apparatus 302 in the variable flux permanent-magnet synchronous motor is not limited. For example, the heating apparatus 302 may be in contact with the second permanent magnet 301, or the heating apparatus 302 may not be in contact with the second permanent magnet 301. In addition, a shape and a component of the heating apparatus 302 are not limited.

When the second permanent magnet 301 is heated by the heating apparatus 302, the temperature of the second permanent magnet 301 rises, and the second permanent magnet 301 has the variable flux in the magnetic field. The magnetic field may be a magnetic field corresponding to a signal generated when a preset current is applied to the motor. In this embodiment of this application, the second permanent magnet 301 implements the variable flux by using the heating apparatus 302. Therefore, the heating apparatus 302 is disposed in the variable flux permanent-magnet synchronous motor, so that the temperature of the second permanent magnet 301 rises, to assist the second permanent magnet 301 in implementing the variable flux and reduce flux adjustment difficulty. Therefore, a material limitation on the second permanent magnet 301 is reduced, so that more permanent magnetic materials can be used for a variable flux magnet, and a range of permanent magnetic materials that can be selected as the variable flux magnet is expanded.

In some embodiments of this application, as shown in FIG. 1 and FIG. 9, a quantity of second permanent magnets 301 is the same as a quantity of heating apparatuses 302, and the second permanent magnets 301 one-to-one correspond to the heating apparatuses 302.

For example, the quantity of second permanent magnets 301 included in the variable flux permanent-magnet synchronous motor is M, the quantity of heating apparatuses 302 included in the variable flux permanent-magnet synchronous motor is M, and a value of M is a positive integer. The quantity of second permanent magnets 301 is equal to the quantity of heating apparatuses 302, and the second permanent magnets 301 one-to-one correspond to the heating apparatuses 302, so that a corresponding heating apparatus 302 is disposed in each second permanent magnet 301, to adjust the temperature of the second permanent magnet 301. When there are a plurality of heating apparatuses 302, all the heating apparatuses 302 may be used for heating, or only some of the heating apparatuses 302 may be used for heating, which is determined with reference to an application scenario. Therefore, flexible temperature control for the M second permanent magnets 301 can be implemented.

In a possible implementation, a controller is further included. The controller is configured to control a temperature that the heating apparatus 302 needs to reach and time required to reach the temperature. In the foregoing solution, the variable flux permanent-magnet synchronous motor further includes the controller. The controller may control the heating apparatus 302. For example, the controller may control a heating temperature and heating time, so that the second permanent magnet 301 can reach the temperature within the time, to implement heating control of the second permanent magnet 301.

In a possible implementation, the controller is configured to input a current to the heating apparatus within the time, so that the heating apparatus reaches the temperature within the time. In the foregoing solution, a temperature of the second permanent magnet 301 is adjusted by controlling the current of the heating apparatus 302. For the heating time of the heating apparatus 302, because the second permanent magnet 301 has a small size and a small specific heat capacity, heat required for a temperature rise is not large, and time for the temperature rise is short, usually less than 10 s. In addition, because the permanent magnet often has a specific initial temperature, the time for the temperature rise can be shorter.

In some embodiments of this application, the time during which the required temperature is reached is the heating time of the heating apparatus 302. For example, the heating time may be a preset period of time. The heating apparatus 302 is configured to heat the second permanent magnet 301 within the preset period of time. A value range of the preset period of time is not limited and needs to be determined based on a specific application scenario. The heating apparatus 302 heats the second permanent magnet 301 within the period of time, and the temperature of the second permanent magnet 301 rises under the action of the heating apparatus 302. After the period of time ends, the heating apparatus 302 stops heating the second permanent magnet 301, and the temperature of the second permanent magnet 301 continuously decreases until the temperature of the second permanent magnet 301 falls back to an operating temperature before this heating. In this embodiment of this application, the heating apparatus 302 heats the second permanent magnet 301, and stops heating after the preset period of time ends. Therefore, the heating apparatus 302 can adjust the temperature of the second permanent magnet 301. After the temperature is adjusted, the temperature of the second permanent magnet 301 decreases, so that the coercive force of the second permanent magnet 301 increases, which can effectively prevent occurrence of accidental demagnetization when the motor operates.

In some embodiments of this application, as shown in FIG. 1, the rotor system 20 further includes a rotor iron core 202, the first permanent magnet 201 is located on the rotor iron core 202, and the second permanent magnet 301 and the heating apparatus 302 are both located on the rotor iron core 202. In the foregoing solution, the rotor system 20 may include the rotor iron core 202 and the first permanent magnet 201 located on the rotor iron core 202. The second permanent magnet 301 has the variable flux in the magnetic field when being heated. In this embodiment of this application, the second permanent magnet 301 and the heating apparatus 302 are both located on the rotor iron core 202. Therefore, the second permanent magnet 301 implements the variable flux by using the heating apparatus 302. Therefore, the heating apparatus 302 is disposed in the variable flux permanent-magnet synchronous motor, to assist the second permanent magnet 301 in implementing the variable flux. This reduces the flux adjustment difficulty and expands the range of permanent magnetic materials that can be selected as the variable flux magnet.

In this embodiment of this application, the variable magnet system 30 includes the second permanent magnet 301 and the heating apparatus 302. Distribution locations of the second permanent magnet 301 and the heating apparatus 302 in the variable magnet system 30 are not limited. The variable magnet system 30 may be located on the rotor system 20, and details are shown in FIG. 1. The rotating shaft system 40 may include a shaft, a bearing, and a shaft sleeve. For example, the variable flux permanent-magnet synchronous motor is an external rotor internal stator motor, and the stator system 10 may be located on the rotating shaft system 40. An air gap 50 is located between an inner surface of the rotor iron core 202 and a tooth part of the stator iron core 101, and the air gap of the motor in this embodiment has specific non-uniformity. An air gap close to a center of the tooth part of the stator iron core 101 is small, and an air gap close to two ends of the tooth part of the stator iron core 101 is large. Alternatively, the variable magnet system 30 may further be located on the stator system 10, and details are shown in FIG. 9.

For example, as shown in FIG. 1 and FIG. 7 to FIG. 9, the variable flux permanent-magnet synchronous motor further includes the stator iron core 101, an armature winding 102, and the rotor iron core 202, where the armature winding 102 is located on the stator iron core 101;

the first permanent magnet 201 is located on the rotor iron core 202; and the second permanent magnet 301 is configured to have the variable flux in a magnetic field when the temperature of the second permanent magnet 301 rises and a preset current is applied to the armature winding 102 to generate the magnetic field.

The structure of the variable flux permanent-magnet synchronous motor may include the stator system 10, the rotor system 20, the variable magnet system 30, and the rotating shaft system 40. The stator system 10 includes the stator iron core 101 and the armature winding 102. The rotor system 20 may include the rotor iron core 202 and the first permanent magnet 201 located on the rotor iron core 202. It should be noted that the first permanent magnet 201 shown in FIG. 1 is indicated by two different symbols due to different polarities. There is a gap between the rotor system 20 and the stator system 10. The variable flux permanent-magnet synchronous motor provided in this embodiment of this application may be a radial flux motor, or may be an axial flux motor. This is not limited herein. In the following embodiments, the radial flux motor is used as an example. The radial flux motor may be an external rotor internal stator motor, such as the external rotor internal stator motor shown in FIG. 1. The radial flux motor may alternatively be an external stator internal rotor motor. This is not limited.

The second permanent magnet 301 is configured to have the variable flux in the magnetic field when the temperature of the second permanent magnet 301 rises. The magnetic field may be a magnetic field corresponding to a signal generated when a preset current is applied to the armature winding 102 in the stator system 10. In this embodiment of this application, the second permanent magnet 301 implements the variable flux by using the heating apparatus 302. Therefore, the heating apparatus 302 is disposed in the variable flux permanent-magnet synchronous motor, to assist the second permanent magnet 301 in implementing the variable flux. This reduces the flux adjustment difficulty, expands the range of optional variable flux magnets, increases a range of speed adjustment of the motor, and improves a torque density of the motor. In addition, in this embodiment of this application, the heating apparatus 302 can adjust the temperature of the second permanent magnet 301. After the temperature is adjusted, the temperature of the second permanent magnet 301 decreases, so that the coercive force of the second permanent magnet 301 increases, which can effectively prevent the occurrence of accidental demagnetization when the motor operates.

Figure 4:
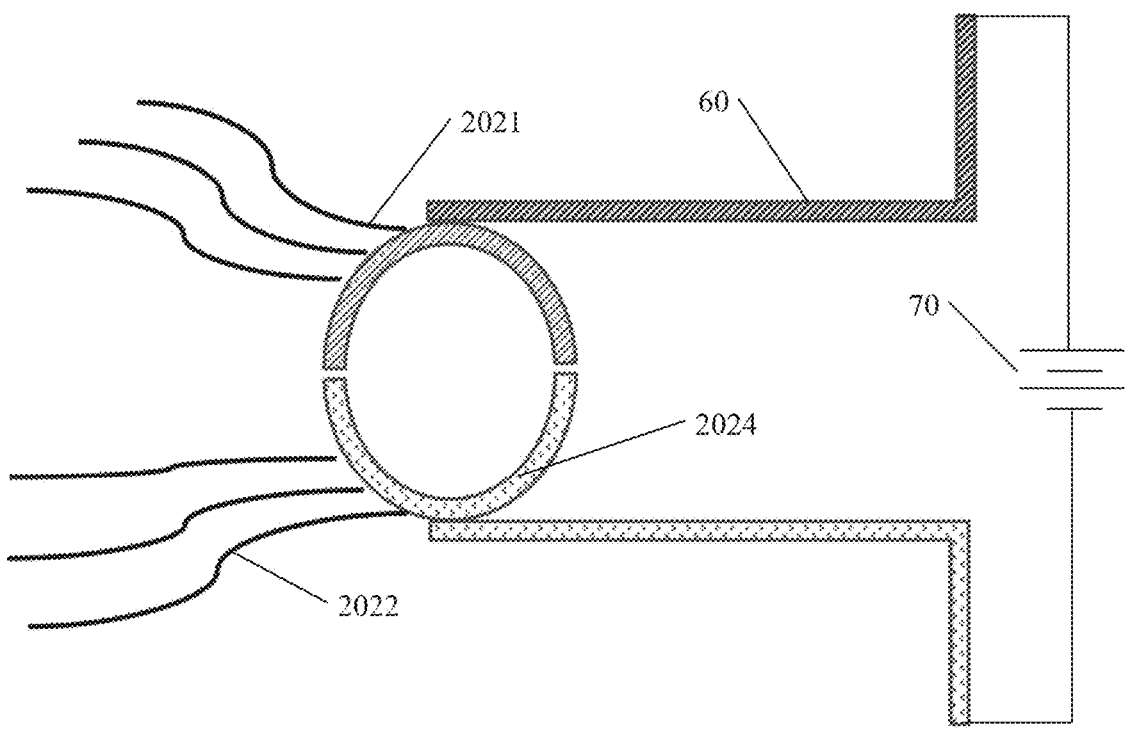
FIG. 4 is a schematic diagram of a connection relationship between a collector ring and an electrical brush according to an embodiment of this application.
Figure 5:
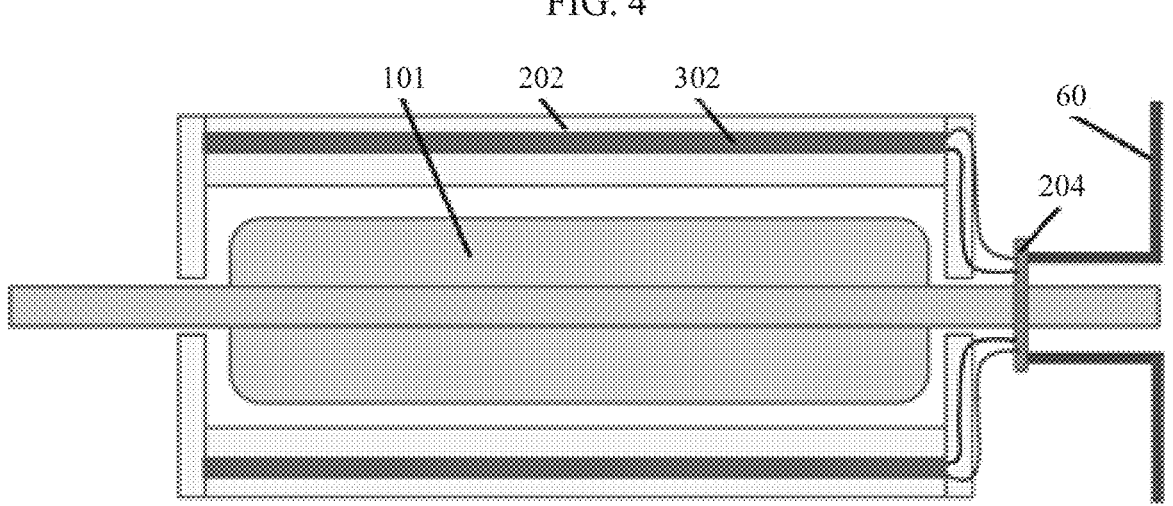
FIG. 5 is a schematic diagram of a sectional view of a connection between a collector ring and an electrical brush according to an embodiment of this application.

In some embodiments of this application, as shown in FIG. 4 and FIG. 5, the variable flux permanent-magnet synchronous motor further includes an electrical brush 60 and a power supply 70. The rotor system 20 further includes a collector ring 204; an end part of the rotor iron core 202 is connected to the collector ring 204, and the collector ring 204 is connected to the power supply 70 through the electrical brush 60; the heating apparatus 302 includes a conducting wire connector, and the conducting wire connector is connected to the collector ring 204; and the power supply 70 outputs a current to the heating apparatus 302 through the electrical brush 60 and the collector ring 204, so that the heating apparatus 302 heats the second permanent magnet 301.

In the foregoing solution, the variable magnet system 30 includes the second permanent magnet 301 and the heating apparatus 302, and the second permanent magnet 301 and the heating apparatus 302 are both located on the rotor iron core 202. A current transmission manner of the heating apparatus 302 may be energy input through the electrical brush 60. A specific structure is as follows: The conducting wire connector of the heating apparatus 302 is connected to the collector ring 204 at the end part of the rotor iron core 202, the collector ring 204 is connected to an external power supply through the electrical brush 60, and when the power supply 70 is turned on, the current sends the energy to the heating apparatus 302 through the electrical brush 60 and the collector ring 204, so that the heating apparatus 302 can supply power to the second permanent magnet 301. It should be noted that, FIG. 4 and FIG. 5 do not show the heating apparatus 302 and the conducting wire connector, and FIG. 4 and FIG. 5 do not show the rotor iron core 202.

For example, as shown in FIG. 4, the rotor iron core 202 includes a positive conducting wire 2021 and a negative conducting wire 2022. One end of the positive conducting wire 2021 and one end of the negative conducting wire 2022 are respectively connected to the collector ring 204, and the other end of the positive conducting wire 2021 and the other end of the negative conducting wire 2022 are connected to the heating apparatus 302. The heating apparatus 302 may heat the second permanent magnet 301 after the current is applied. The following describes a power supply manner of the heating apparatus 302. An example in which the variable magnet system 30 is located on the rotor system 20 is used. The second permanent magnet 301 and the heating apparatus 302 are both located on the rotor iron core 202. As shown in FIG. 4, the variable flux permanent-magnet synchronous motor further includes the collector ring 204 and the electrical brush 60. The end part of the rotor iron core 202 is connected to the collector ring 204, and the collector ring 204 is connected to the power supply through the electrical brush 60; the heating apparatus 302 includes the conducting wire connector, and the conducting wire connector is connected to the collector ring 204; and the power supply supplies power to the heating apparatus 302 through the electrical brush 60 and the collector ring 204.

Figure 6:
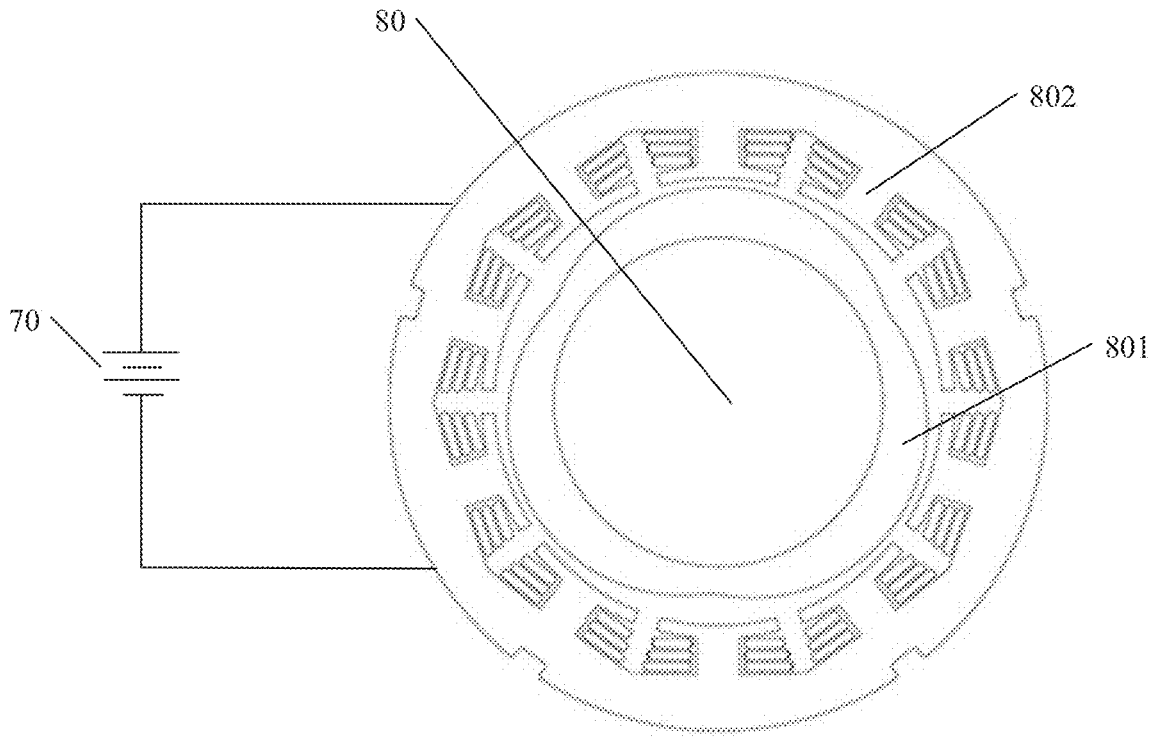
FIG. 6 is a schematic diagram of a connection between a rotating transformer and a power supply according to an embodiment of this application.

In some embodiments of this application, as shown in FIG. 6, the variable flux permanent-magnet synchronous motor further includes the power supply 70 and a rotating transformer 80. The rotating transformer 80 includes a rotor winding 801 and a stator winding 802; the end part of the rotor iron core 202 is connected to the rotor winding 801, and the stator winding 802 is connected to the power supply 70; the heating apparatus 302 includes the conducting wire connector, and the conducting wire connector is connected to the rotor winding 801; and the power supply 70 outputs a current to the heating apparatus 302 by using the rotating transformer 80, so that the heating apparatus 302 heats the second permanent magnet 301.

In the foregoing solution, the variable magnet system 30 includes the second permanent magnet 301 and the heating apparatus 302, and the second permanent magnet 301 and the heating apparatus 302 are both located on the rotor iron core 202. A current transmission manner of the heating apparatus 302 may be energy input in a manner similar to wireless excitation. A specific structure is as follows: The conducting wire connector of the heating apparatus 302 is connected to the rotor winding of the rotating transformer at the end part of the rotor iron core 202, the stator winding of the rotating transformer is connected to an external power supply, and when the power supply 70 is turned on, the current sends the energy to the heating apparatus 302 by using the rotating transformer, so that the heating apparatus 302 can supply power to the second permanent magnet 301.

For example, the heating apparatus 302 may heat the second permanent magnet 301 after the current is applied.

The following describes a power supply manner of the heating apparatus 302. An example in which the variable magnet system 30 is located on the rotor system 20 is used. The second permanent magnet 301 and the heating apparatus 302 are both located on the rotor iron core 202. As shown in FIG. 6, the variable flux permanent-magnet synchronous motor further includes the rotating transformer 80. The rotating transformer 80 includes the rotor winding 801 and the stator winding 802, and the end part of the rotor iron core 202 is connected to the rotor winding 801. The end part of the rotor iron core 202 is not shown in FIG. 6. The stator winding 802 is connected to the power supply 70, and the heating apparatus 302 includes the conducting wire connector. The heating apparatus 302 is not shown in FIG. 6. The conducting wire connector is connected to the rotor winding 801, and the power supply 70 supplies power to the heating apparatus 302 by using the rotating transformer 80.

In some embodiments of this application, the armature winding 102 may perform flux adjustment (referred to as flux adjustment for short) on the second permanent magnet 301 after the current is applied. The following describes a flux adjustment manner of the armature winding 102.

The stator system 10 further includes the stator iron core 101 and the armature winding 102; the armature winding 102 is located on the stator iron core 101; and the flux of the second permanent magnet 301 is adjusted based on a magnetic field generated by a D-axis current, where duration for which the D-axis current is applied to the armature winding 102 is less than a preset duration threshold.

In the foregoing solution, variable flux of the second permanent magnet 301 may be implemented in a plurality of manners. For example, forward or reverse variable flux is generated by using a direct-axis (that is, the D-axis) current on the stator system 10. The applied duration of the D-axis current is less than the preset duration threshold. A value of the duration threshold is not limited. For example, the duration of the D-axis current may be referred to as short duration. When the variable magnet system 30 is located on the rotor system 20, the short-duration D-axis current may be applied to the armature winding 102 to perform magnetization enhancement or magnetization weakening processing on the second permanent magnet 301 in a high-temperature state, thereby adjusting the flux of the second permanent magnet 301.

The variable flux of the second permanent magnet 301 may be implemented in a plurality of manners. For example, forward or reverse variable flux is generated by using a D-axis current on the stator system 10. In a control scenario of the variable flux permanent-magnet synchronous motor, to obtain a control characteristic similar to a direct current motor, a coordinate system is established on the rotor of the motor, and the coordinate system rotates synchronously with the rotor. A direction of a rotor magnetic field is used as a quadrature axis, and the quadrature axis is also referred as the Q axis. A direction perpendicular to the rotor magnetic field is a direct axis, and the direct axis is also referred to as a D axis. A mathematical model of the motor is converted to the coordinate system, so that decoupling of the D axis and the Q axis can be implemented, to obtain a good control characteristic. The applied duration of the D-axis current is less than the preset duration threshold. A value of the duration threshold is not limited. For example, the duration of the D-axis current is short, which may be referred to as short duration. When the variable magnet system 30 is located on the rotor system 20, the short-duration D-axis current may be applied to the armature winding 102 to perform magnetization enhancement or magnetization weakening processing on the second permanent magnet 301 in a high-temperature state, thereby adjusting the flux of the second permanent magnet 301.

Figure 2:
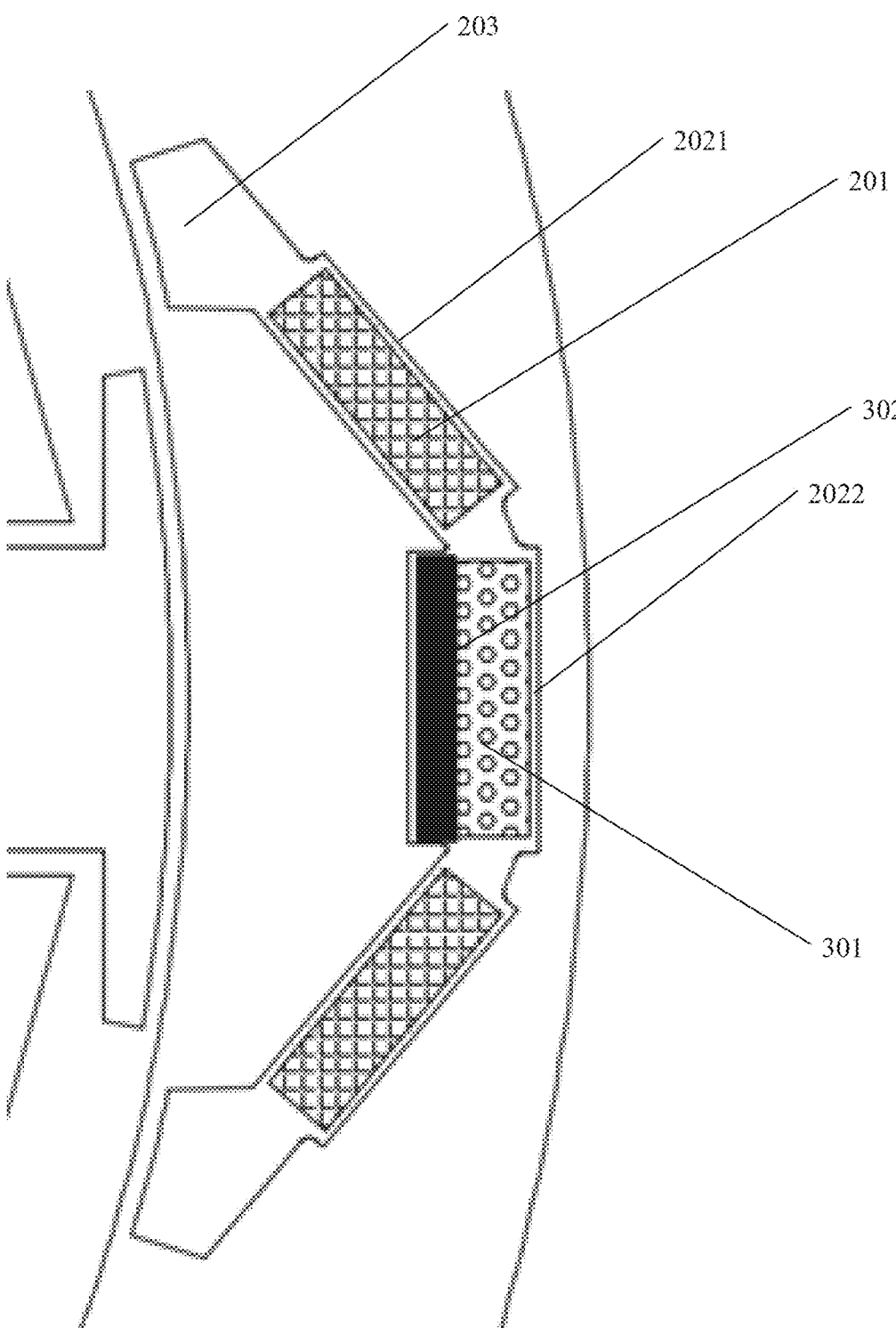
FIG. 2 is a partially enlarged schematic diagram of a variable magnet system according to an embodiment of this application.

In some embodiments of this application, as shown in FIG. 2, the heating apparatus 302 includes a heating plate 302, a U-shaped cavity is disposed on the rotor iron core 202, the U-shaped cavity includes a wing part 2021 and a bottom part 2022, the first permanent magnet 201 is located at the wing part 2021, the second permanent magnet 301 is located at the bottom part 2022, and the heating plate 302 is located on a side that is of the second permanent magnet 301 and that is close to an opening of the U-shaped cavity.

Figure 7:
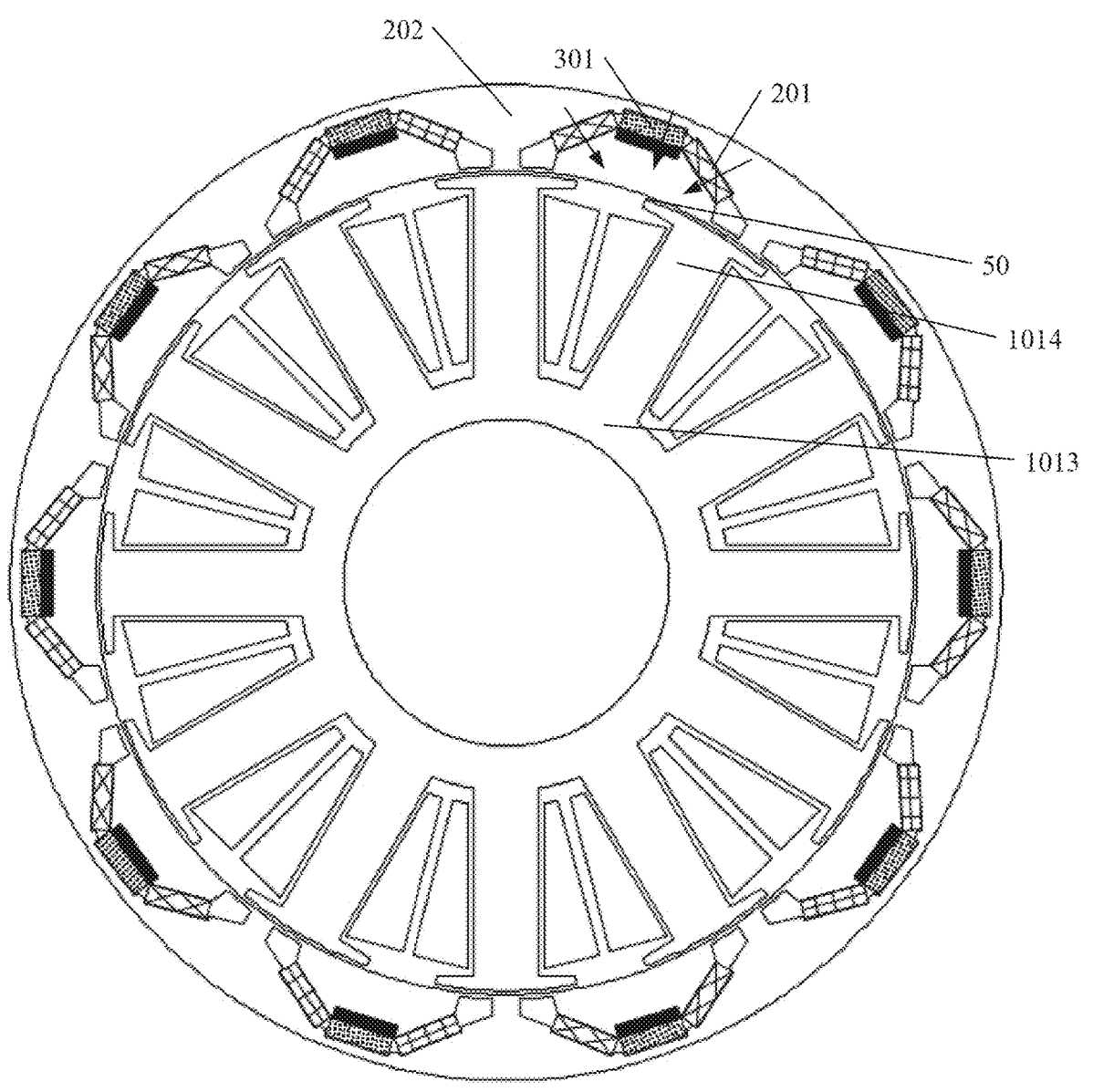
FIG. 7 is a schematic diagram of non-load magnetic field distribution of a variable flux permanent-magnet synchronous motor during magnetization enhancement operation according to an embodiment of this application.

In the foregoing solution, the heating apparatus 302 has a plurality of shapes. For example, the heating apparatus is the heating plate 302, the second permanent magnet 301 and the heating apparatus 302 are both located on the rotor iron core 202, and the first permanent magnet 201 and the second permanent magnet 301 are located at different ends of the U-shaped cavity. For example, the U-shaped cavity is disposed on the rotor iron core 202; the first permanent magnet 201, the second permanent magnet 301, and the heating apparatus 302 are all distributed according to the U-shaped cavity. For example, the U-shaped cavity has two wing parts 2021 (or referred to as side parts), and the first permanent magnet 201 is located on two wings of the U-shaped cavity, and the second permanent magnet 301 is located at the bottom part 2022 of the U-shaped cavity; and the heating apparatus 302 is located on the side that is of the second permanent magnet 301 and that is close to the opening of the U-shaped cavity. As shown in FIG. 7, arrows indicate magnetization directions of the permanent magnet. The flux starts from one pole (for example, a north pole) of the first permanent magnet 201 of the U-shaped cavity, passes through the rotor iron core 202, directly reaches the other pole (for example, a south pole) of the second permanent magnet 301, then passes through a yoke part of the rotor iron core 202, and returns to the other pole (for example, a south pole) of the first permanent magnet 201. A local magnetic loop is formed, so that most of the flux forms a short circuit inside the rotor system.

In some embodiments of this application, as shown in FIG. 9 to FIG. 12, the rotor system 20 further includes a rotor iron core 202, the first permanent magnet 201 is located on the rotor iron core 202, the stator system 10 includes a stator iron core 101, and the second permanent magnet 301 and the heating apparatus 302 are both located on the stator iron core 101.

In the foregoing solution, the rotor system 20 may include the rotor iron core 202 and the first permanent magnet 201 located on the rotor iron core 202. The second permanent magnet 301 has variable flux in a magnetic field when being heated. In this embodiment of this application, the second permanent magnet 301 and the heating apparatus 302 are both located on the stator iron core 101. Therefore, the second permanent magnet 301 implements the variable flux by using the heating apparatus 302. Therefore, the heating apparatus 302 is disposed in the variable flux permanent-magnet synchronous motor, to assist the second permanent magnet 301 in implementing the variable flux. This reduces flux adjustment difficulty and expands a range of permanent magnetic materials that can be selected as a variable flux magnet.

Figure 10:
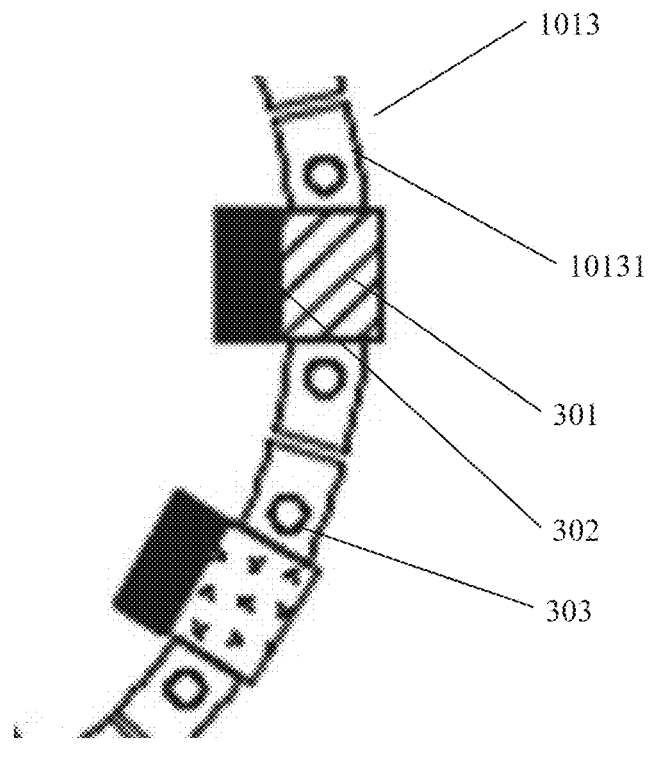
FIG. 10 is a partially enlarged schematic diagram of a variable magnet system according to an embodiment of this application.

In some embodiments of this application, as shown in FIG. 10, the heating apparatus 302 includes a heating plate 302; a U-shaped cavity is disposed on the rotor iron core 202, and the first permanent magnet 201 is located in the U-shaped cavity; the stator iron core 101 includes an outer stator yoke 1013, the outer stator yoke 1013 includes an inner slot 10131, and the second permanent magnet 301 is located in the inner slot 10131; and an inner surface of the second permanent magnet 301 has a gap, the heating plate 302 is located in the gap, and the heating plate 302 is in contact with the second permanent magnet 301.

Figure 11:
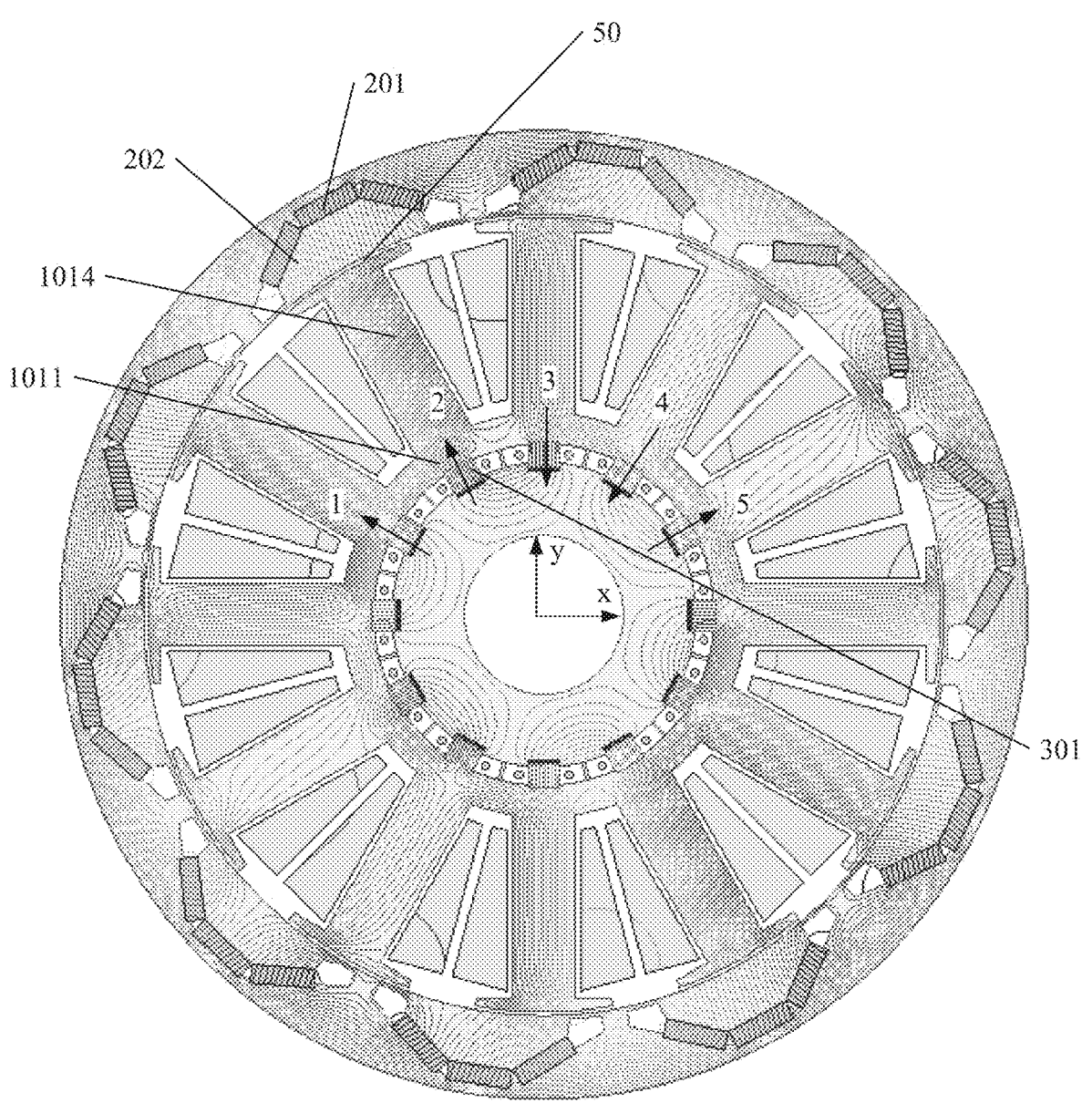
FIG. 11 is a schematic diagram of non-load magnetic field distribution of another variable flux permanent-magnet synchronous motor during magnetization enhancement operation according to an embodiment of this application.

In the foregoing solution, the heating apparatus 302 has a plurality of shapes. For example, the heating apparatus is the heating plate 302, the second permanent magnet 301 and the heating apparatus 302 are both located on an inner slot of the stator iron core 101, and the first permanent magnet 201 is located in the U-shaped cavity of the rotor iron core 202. The rotor iron core 202 has a plurality of shapes. For example, the U-shaped cavity is disposed on the rotor iron core 202, and the first permanent magnet 201 is distributed according to the U-shaped cavity. For example, the first permanent magnet 201 is located in the U-shaped cavity, the inner slot is formed in the outer stator yoke 1013 of the stator iron core 101, the second permanent magnet 301 is located in the inner slot, and the heating apparatus 302 is located in the gap of the inner surface of the second permanent magnet 301, and the heating apparatus 302 is in contact with the second permanent magnet 301. As shown in FIG. 11, arrows indicate magnetization directions of the permanent magnet. Most of the permanent magnetic flux starts from one pole (for example, a north pole) of the second permanent magnet 301, passes through the rotor iron core 202 to reach the other pole (for example, a south pole) of the first permanent magnet 201 of the U-shaped cavity, then starts from one pole (for example, a north pole) of the first permanent magnet 201 of the U-shaped cavity, passes through a yoke part of the rotor iron core 202, passes through the first permanent magnet 201 of an adjacent U-shaped cavity, passes through the rotor iron core 202 to a stator tooth part 1014 of the rotor iron core 202, passes through the stator iron core 101 to reach the other pole (for example, a south pole) of an adjacent second permanent magnet 301 with an opposite orientation, and passes through the stator iron core 101 to reach the other pole (for example, a south pole) of the second permanent magnet 301 from which the flux starts, thereby implementing a magnetic loop. A small part of the flux of the second permanent magnet 301 is inside the stator iron core 101, and the flux of the first permanent magnet 201 is inside the rotor iron core 202, to form a local magnetic loop.

In some embodiments of this application, the heating apparatus 302 may heat the second permanent magnet 301 after a current is applied. The following describes a power supply manner of the heating apparatus 302. An example in which the variable magnet system 30 is located on the stator system 10 is used. The variable flux permanent-magnet synchronous motor further includes a power supply 70. The heating apparatus 302 includes a conducting wire connector, and the conducting wire connector is connected to the power supply 70; and the power supply 70 outputs a current to the heating apparatus 302, so that the heating apparatus 302 heats the second permanent magnet 301.

In the foregoing solution, the variable magnet system 30 includes the second permanent magnet 301 and the heating apparatus 302, and the second permanent magnet 301 and the heating apparatus 302 are both located on the stator iron core 101. A current transmission manner of the heating apparatus 302 may be energy input through the conducting wire of the heating apparatus 302. A specific structure is as follows: The variable magnet system 30 may also be disposed on the stator iron core 101. Because the stator system 10 is in a static state, when the variable magnet system 30 is located on the stator system 10, the conducting wire of the heating apparatus 302 may be directly connected to an external power supply, and when the power supply 70 is turned on, the current is sent to the heating apparatus 302 through the conducting wire, so that the heating apparatus 302 can supply power to the second permanent magnet 301.

In some embodiments of this application, an armature winding 102 may perform flux adjustment on the second permanent magnet 301 after the current is applied. The following describes a flux adjustment manner of the armature winding 102. An example in which the variable magnet system 30 is located on the stator system 10 is used. The second permanent magnet 301 and the heating apparatus 302 are both located on the stator iron core 101. As shown in FIG. 10, the variable magnet system 30 further includes a single-phase pulse winding 303; the single-phase pulse winding 303 is located in the inner slot 10131, and the single-phase pulse winding 303 is adjacent to the second permanent magnet 301; and the flux of the second permanent magnet 301 is adjusted based on a magnetic field generated by a current applied to the single-phase pulse winding 303. In the foregoing solution, variable flux of the second permanent magnet 301 may be implemented in a plurality of manners. For example, a single-phase pulse winding 303 is added to the stator system 10 to generate variable flux. When the variable magnet system 30 is located on the stator system 10, a single-phase pulse winding 303 may be added to the stator system 10, and the single-phase pulse winding 303 may also be referred to as a pulse flux adjustment winding. The single-phase pulse winding 303 may be formed by connecting newly added armature windings 102 of three phases head to tail in series, or may be formed by connecting the armature windings 102 in the stator system 10 head to tail in series. The flux adjustment is performed on the second permanent magnet 301 at a high temperature by using the single-phase pulse winding 303.

For example, variable flux of the second permanent magnet 301 may be implemented in a plurality of manners. For example, refer to FIG. 9. A single-phase pulse winding 303 is added to the stator system 10 to generate variable flux. When the variable magnet system 30 may be located on the stator system 10, a single-phase pulse winding 303 may be added to the stator system 10, and the single-phase pulse winding 303 may also be referred to as a pulse flux adjustment winding. The single-phase pulse winding 303 may be formed by connecting newly added armature windings 102 of three phases head to tail in series, or may be formed by connecting the armature windings 102 in the stator system 10 head to tail in series. The flux adjustment is performed on the second permanent magnet 301 at a high temperature by using the single-phase pulse winding 303.

In some embodiments of this application, a coercive force temperature coefficient of the second permanent magnet 301 is greater than or equal to −0.5%/K.

When a temperature of the second permanent magnet 301 is greater than or equal to a highest operating temperature of the variable flux permanent-magnet synchronous motor, the coercive force of the second permanent magnet 301 is greater than or equal to 150 kA/m and less than or equal to 300 kA/m.

K indicates Kelvin temperature and kA/m indicates kilo-amperes per meter.

The coercive force of the second permanent magnet 301 is lower than the coercive force of the first permanent magnet 201, and has flux that varies in a magnetic field at a high temperature when a preset current is applied to the armature winding 102. Compared with the second permanent magnet 301, the first permanent magnet 201 is a fixed magnet, and flux of the first permanent magnet 201 may change with a temperature rise of the motor. However, the first permanent magnet 201 has high coercive force even at the high temperature, and the flux does not change due to a change of an external magnetic field. The second permanent magnet 301 is a variable flux magnet. To adjust the flux of the second permanent magnet 301, the coercive force of the second permanent magnet 301 at the high temperature is only 150 kA/m to 300 kA/m. A specific temperature varies with working conditions of different types of motors. This is not limited herein.

For example, the coercive force of the second permanent magnet 301 at the high temperature is 150 kA/m to 300 kA/m, and the coercive force temperature coefficient of the second permanent magnet 301 is greater than or equal to 0.5%/K. Coercive force grades of the second permanent magnet 301 are N, M, H, SH, UH, EH, and the like, and highest operating temperatures corresponding to the coercive force grades are 80° C., 100° C., 120° C., 150° C., 180° C., and 200° C. The second permanent magnet 301 is a permanent magnet with a low coercive force grade whose coercive force grade is usually lower than H and more likely lower than N.

In some embodiments of this application, the second permanent magnet 301 is a neodymium-iron-boron (element symbol: NdFeB) permanent magnet.

Coercive force of the neodymium-iron-boron permanent magnet is high, and it is too difficult to perform flux adjustment on the neodymium-iron-boron permanent magnet. In this embodiment of this application, the heating apparatus 302 performs the flux adjustment on the neodymium-iron-boron permanent magnet, so that the neodymium-iron-boron permanent magnet is suitable for becoming a variable flux magnet. According to the motor structure provided in this embodiment of this application, difficulty in adjusting the flux of the magnet is reduced, and a material selection range of the variable flux magnet is greatly expanded, so that the neodymium-iron-boron permanent magnetic material can also be applied to the variable magnet of the variable flux motor.

For example, the second permanent magnet 301 in this embodiment of this application is a neodymium-iron-boron permanent magnet (which may also be referred to as a neodymium-iron-boron series permanent magnet), coercive force of the neodymium-iron-boron permanent magnet at a high temperature is 150 kA/m to 300 kA/m, and a coercive force temperature coefficient of the neodymium-iron-boron permanent magnet is more than or equal to 0.5%/K. Coercive force grades of the neodymium-iron-boron permanent magnet are N, M, H, SH, UH, EH, and the like, and highest operating temperatures corresponding to the coercive force grades are 80° C., 100° C., 120° C., 150° C., 180° C., and 200° C. The second permanent magnet 301 is a permanent magnet with a low coercive force grade whose coercive force grade is usually lower than H and more likely lower than N.

In this embodiment of this application, the second permanent magnet 301 may be another variable flux magnet in addition to the neodymium-iron-boron permanent magnet. This is not limited. For example, the second permanent magnet 301 may further be a samarium-cobalt (SmCo) permanent magnet. In this embodiment of this application, the heating apparatus 302 performs the flux adjustment on the samarium-cobalt (SmCo) permanent magnet, so that the samarium-cobalt permanent magnet is suitable for becoming the variable flux magnet. The neodymium-iron-boron permanent magnet has a high remanence. Therefore, a range of speed adjustment of the motor is greatly increased and a torque density of the variable flux permanent-magnet synchronous motor is ensured.

Further, in some embodiments of this application, the second permanent magnet 301 has a main alloy composition of $(Nd_{1-a}RE_a)_xFe_{bal}B_yM_z$.

RE indicates a rare earth element, Nd indicates neodymium, Fe indicates Ferrum, B indicates boron, RE is one or more of lanthanum La, cerium Ce, yttrium Y, praseodymium Pr, holmium Ho, and gadolinium Gd, M is one or more of cobalt Co, cuprum Cu, niobium Nb, gallium Ga, aluminum Al, zinc Zn, nickel Ni, silicon Si, zirconium Zr, molybdenum Mo, vanadium V, and titanium Ti, a ranges from 0 to 1, x ranges from 15 wt % to 35 wt %, y ranges from 0.8 wt % to 1.2 wt %, z ranges from 0 wt % to 5 wt %, bal indicates a percentage by weight in which a remaining composition is Ferrum Fe, and wt % indicates a percentage by weight.

The second permanent magnet 301 may be a neodymium-iron-boron permanent magnet with low coercive force, for example, a neodymium-iron-boron magnet containing rich rare earth elements (La, Ce, Y, MM, and the like), and a main alloy composition of the neodymium-iron-boron permanent magnet is $(Nd_{1-a}RE_a)_xFe_{bal}B_yM_z$. RE (rare earth, RE) is one or more of La, Ce, Y, Pr, Ho and Gd, and rich rare earth refers to rare earths with rich reserves and low costs in the rare earth, such as La, Ce and Y, M is one or more of Co, Cu, Nb, Ga, Al, Zn, Ni, Si, Zr, Mo, V, Ti and the like, a ranges from 0 to 1, x ranges from 15 wt % to 35 wt %, y ranges from 0.8 wt % to 1.2 wt %, z ranges from 0 wt % to 5 wt %, and rest is Fe and impurities. The rich rare earth elements are introduced into the variable flux permanent magnet, so that the coercive force of the neodymium-iron-boron magnet can be reduced, flux adjustment difficulty can be reduced, and costs of the second permanent magnet 301 can be reduced.

Further, in some embodiments of this application, the second permanent magnet 301 is a sintered neodymium-iron-boron permanent magnet, or the second permanent magnet 301 is a bonded neodymium-iron-boron permanent magnet made by pressing or injection molding after neodymium-iron-boron magnetic powder and a bonding agent are mixed.

The second permanent magnet 301 may be the sintered neodymium-iron-boron permanent magnet, or may be the bonded neodymium-iron-boron permanent magnet made by the pressing or injection molding after the neodymium-iron-boron magnetic powder and the bonding agent are mixed. The neodymium-iron-boron permanent magnet may be obtained by using the foregoing different manufacturing processes. A specific implementation is not limited herein.

In some embodiments of this application, a quantity of second permanent magnets 301 included in the variable flux permanent-magnet synchronous motor is M, a quantity of heating apparatuses 302 included in the variable flux permanent-magnet synchronous motor is M, and a value of M is a positive integer.

The second permanent magnets 301 one-to-one correspond to the heating apparatuses 302.

When M is greater than 1, all heating apparatuses 302 in the M heating apparatuses 302 are configured to heat the M second permanent magnets 301, or N heating apparatuses 302 in the M heating apparatuses 302 are configured to heat N second permanent magnets 301 in the M second permanent magnets 301, where N is a positive integer less than M.

The quantity of second permanent magnets 301 is equal to the quantity of heating apparatuses 302, and the second permanent magnets 301 one-to-one correspond to the heating apparatuses 302. When there are a plurality of heating apparatuses 302, all the heating apparatuses 302 may be used for heating, or only some of the heating apparatuses 302 may be used for heating, which is determined with reference to an application scenario. Therefore, flexible temperature control for the M second permanent magnets 301 can be implemented.

For example, the variable magnet system 30 is symmetrically disposed on the rotor system 20 of the motor. As shown in FIG. 1, the quantity of second permanent magnets in the variable magnet system 30 is equal to a quantity of magnetic poles on the rotor iron core 202. Alternatively, as shown in FIG. 9, the variable magnet system is symmetrically disposed on the stator system 10, and the quantity of second permanent magnets in the variable magnet system 30 is equal to a quantity of slots in the stator iron core 101. For example, when the rotor iron core 202 is 10 poles, the variable magnet system 30 may be 10 poles. The variable magnet system 30 on a single magnetic pole may be a single permanent magnet and a single heating apparatus 302, or may be a plurality of permanent magnets and a plurality of heating apparatuses 302, and is configured to adjust an overall or partial temperature of the permanent magnet with low coercive force. For example, the variable magnet system 30 on a single magnetic pole includes three permanent magnets and three corresponding heating apparatuses 302, and the flux adjustment may be performed on the three permanent magnets after the three permanent magnets are simultaneously heated, or the flux adjustment may be performed on one or two of the permanent magnets.

In some embodiments of this application, the temperature of the second permanent magnet 301 is adjusted by controlling a current of the heating apparatus 302.

When a temperature difference between the temperature of the second permanent magnet 301 and the highest operating temperature of the variable flux permanent-magnet synchronous motor reaches a preset temperature difference range, the second permanent magnet 301 has the variable flux in the magnetic field.

A flux adjustment temperature of the second permanent magnet 301 is adjusted by controlling the current of the heating apparatus 302. When the temperature difference between the temperature of the second permanent magnet 301 and the highest operating temperature of the variable flux permanent-magnet synchronous motor reaches a preset temperature difference range, the second permanent magnet 301 has the variable flux. For example, the flux adjustment temperature is higher than the highest operating temperature of the motor. For example, a value of the temperature difference range may be 10° C. to 20° C. In other words, the flux adjustment temperature of the second permanent magnet 301 may be 10° C. to 20° C. higher than the highest operating temperature of the motor. A specific value of the temperature difference range is not limited herein. For example, the highest operating temperature of the motor is 120° C., and the flux adjustment temperature may be set to 130° C. In this way, occurrence of accidental demagnetization of the second permanent magnet 301 can be avoided when the motor operates. For heating time of the heating apparatus 302, because the second permanent magnet 301 has a small size and a small specific heat capacity, heat required for a temperature rise is not large, and time for the temperature rise is short, usually less than 10 s. In addition, because the permanent magnet often has a specific initial temperature, the time for the temperature rise can be shorter.

The coercive force of the second permanent magnet 301 is lower than the coercive force of the first permanent magnet 201, and has the flux that varies in the magnetic field at the high temperature when the preset current is applied to the armature winding 102. Compared with the second permanent magnet 301, the first permanent magnet 201 is a fixed magnet, and flux of the first permanent magnet 201 may change with a temperature rise of the motor. However, the first permanent magnet 201 has high coercive force even at the high temperature, and the flux does not change due to a change of an external magnetic field. The second permanent magnet 301 is a variable flux magnet. To adjust the flux of the second permanent magnet 301, the coercive force of the second permanent magnet 301 at the high temperature is only 150 kA/m to 300 kA/m. A specific temperature varies with working conditions of different types of motors. For example, a highest operating temperature of a motor for a fan is 110° C., and a high temperature value of the second permanent magnet 301 is higher than 110° C. For example, a highest operating temperature of a drive motor for a new energy vehicle is 150° C., and the high temperature value of the second permanent magnet 301 is higher than 150° C. The temperature of the second permanent magnet 301 may be adjusted by using the heating apparatus 302, and the heating apparatus 302 controls a change of heating power by adjusting a value of the current passing through the heating apparatus 302.

In some embodiments of this application, the heating apparatus 302 includes at least one of the following: a heating plate, a heating wire, or a heating film.

A specific shape of the heating apparatus 302 has a plurality of implementations, which is not limited and needs to be determined with reference to a specific application scenario of the motor. For example, the heating apparatus 302 includes at least one of the following: a heating plate, a heating wire, or a heating film.

For example, the heating plate includes at least one of the following: a ceramic heating plate, a mica heating plate, a stainless steel heating plate, and a graphene heating plate.

For example, the heating film includes a polyimide (PI) heating film.

For example, the heating wire includes at least one of the following: an iron chromium aluminum wire, a nickel chromium wire, and a constantan wire. Optionally, the heating wire may be a material such as an iron chromium aluminum wire, a nickel chromium wire, or a constantan wire. This is not limited herein.

In some embodiments of this application, a temperature at which the heating apparatus 302 is operable exceeds 200° C., and heating power of the heating apparatus 302 is greater than 1.5 w/cm².

° C. indicates degree Celsius and w/cm² indicates power per unit area.

The temperature at which the heating apparatus 302 is operable needs to exceed an operating temperature of the variable flux permanent-magnet synchronous motor, to prevent damage of the heating apparatus 302 during operation of the variable flux permanent-magnet synchronous motor. For example, the operating temperature of the variable flux permanent-magnet synchronous motor ranges from 150° C. to 200° C., and the temperature at which the heating apparatus 302 is operable exceeds 200° C. Therefore, the damage of the heating apparatus 302 due to the operating temperature of the motor can be avoided. In addition, the heating apparatus 302 needs to quickly heat the second permanent magnet 301. Therefore, the heating power of the heating apparatus 302 is greater than 1.5 w/cm 2, so that the heating apparatus 302 can quickly heat the second permanent magnet 301. For example, the heating apparatus 302 may complete heating of the second permanent magnet 301 within 10 seconds, and heating efficiency of the second permanent magnet 301 can be improved by using the heating apparatus 302.

In some embodiments of this application, a thickness of the heating apparatus 302 is greater than or equal to 0.1 mm and less than or equal to 10 mm.

mm indicates millimeter.

The heating apparatus 302 may be configured to heat the second permanent magnet 301. To reduce impact of the heating apparatus 302 on a magnetic circuit of the motor, the thickness of the heating apparatus 302 needs to be reduced as much as possible. For example, a value of the thickness of the heating apparatus 302 may be 0.1 mm to 10 mm. The thickness of the heating apparatus 302 may be flexibly set based on an actual size of the motor and an actual size of the second permanent magnet 301. This is not limited herein. The heating apparatus 302 disposed in the foregoing manner has an advantage of a small size. Further, a value of the thickness of the heating apparatus 302 is 0.1 mm to 1 mm, so that the heating apparatus 302 can be accommodated in a gap between the second permanent magnet 301 and the iron core. In addition, the heating apparatus 302 disposed in the foregoing manner can reduce impact on a power density of the motor.

In some embodiments of this application, a heat generation surface of the heating apparatus 302 is in contact with a surface of the second permanent magnet 301.

The heat generation surface (or referred to as a heating surface) of the heating apparatus 302 is directly in contact with the surface of the permanent magnet, thereby improving the heating efficiency of the second permanent magnet 301. The heating apparatus 302 may further heat the second permanent magnet 301 in a manner in which the heat generation surface is not in contact with the surface of the second permanent magnet 301, that is, in a heat conduction manner. This is not limited.

In some embodiments of this application, the first permanent magnet 201 has flux that does not change due to a change of a magnetic field.

The first permanent magnet 201 is the fixed magnet, and the flux of the first permanent magnet 201 may change with a temperature rise of the motor. However, the first permanent magnet 201 has the high coercive force even at the high temperature, and the flux does not change due to the change of the external magnetic field.

In some embodiments of this application, the first permanent magnet 201 is a permanent magnet with a single magnetic property, or the first permanent magnet 201 is a plurality of permanent magnets with different magnetic properties.

The first permanent magnet 201 may be the permanent magnet with the single magnetic property, or may be the plurality of permanent magnets with different magnetic properties, and is used to distinguish the second permanent magnet 301 on which the flux adjustment needs to be performed. For example, the first permanent magnet 201 may be the neodymium-iron-boron permanent magnet of the high coercive force grade, such as UH or EH. The first permanent magnet 201 may also include a neodymium-iron-boron permanent magnet mixed with medium to high coercive force grades, for example, SH and UH. The first permanent magnet 201 may even be a mixture of different types of permanent magnets, for example, mixing of a neodymium-iron-boron permanent magnet and a samarium-cobalt permanent magnet.

It can be learned from the examples for description of this application in the foregoing embodiments that, in the variable flux permanent-magnet synchronous motor, the rotor system 20 includes the first permanent magnet 201, and the variable magnet system 30 includes the second permanent magnet 301. The two permanent magnets have different coercive force, and the second permanent magnet 301 is heated by using the heating apparatus 302. The heating apparatus 302 may assist the second permanent magnet 301 in implementing the variable flux in the magnetic field. In the variable flux permanent-magnet synchronous motor, the heating apparatus 302 heats the second permanent magnet 301, so that the temperature of the second permanent magnet 301 rises. This can reduce the flux adjustment difficulty of the second permanent magnet 301 and expand the range of permanent magnetic materials that can be selected as the variable flux magnet.

For better understanding and implementation of the foregoing solutions in embodiments of this application, specific descriptions are provided below by using corresponding application scenarios as examples.

Embodiment 1

FIG. 1 is a schematic diagram of a structure of a variable flux permanent-magnet synchronous motor according to an embodiment of this application. In the following embodiments, an example in which the variable flux permanent-magnet synchronous motor is an external rotor internal stator motor is used. The variable flux motor described in this implementation is an external rotor internal stator motor having 12 slots (s) and 10 poles (p). A structure of the external rotor internal stator motor includes a rotating shaft system 40, a stator system 10, a rotor system 20, and a variable magnet system 30 located on the rotor from inside to outside. The rotating shaft system 40 includes a shaft, a bearing, and a shaft sleeve. The stator system 10 is located on the shaft sleeve outside the rotating shaft and includes 12 "T"-shaped stator iron cores 101 and an armature winding 102 located on each of the stator iron cores 101. The "T"-shaped stator iron core 101 is evenly distributed around a circumference of the stator. A stator tooth part 1014 of the stator iron core 101 is located on an outer side the "T"-shaped stator iron core 101, an outer stator yoke 1013 of the stator iron core 101 is located on an inner side of the "T"-shaped stator iron core 101, and the armature winding 102 is located in a cavity between adjacent "T"-shaped stator iron cores 101.

As shown in FIG. 2, outside the stator iron core 101 is the rotor system 20. The rotor system 20 includes a rotor iron core 202, a rotor slot 2023 in the rotor iron core 202 being a U-shaped cavity, and a first permanent magnet 201, a second permanent magnet 301 and a heating plate on a surface of the second permanent magnet 301 that are in the U-shaped cavity. On two sides of a second permanent magnet 301 shown in FIG. 1 are first permanent magnets 201 of one polarity, and on two sides of a next adjacent second permanent magnet 301 are first permanent magnets 201 of another polarity. For example, the polarities are different, and may be a north (N) pole and a south (S) pole. The variable magnet system 30 includes the second permanent magnet 301 and the heating plate. The first permanent magnet 201 is a permanent magnet with high coercive force and is located on two wings of the U-shaped cavity, and on two sides of the first permanent magnet 201 are magnetic isolation bridges 203. The second permanent magnet 301 is a permanent magnet with low coercive force, and is located at the bottom of the U-shaped cavity. The heating plate is located on a side that is of the second permanent magnet 301 and that is close to an opening of the U-shaped cavity, and a heating surface of the heating plate is in direct contact with the second permanent magnet 301. An air gap 50 is located between an inner surface of the rotor iron core 202 and the stator tooth part 1014 of the stator iron core 101, and the air gap 50 of the motor in this embodiment has specific non-uniformity. An air gap 50 close to a center of the stator tooth part 1014 of the stator iron core 101 is small, and an air gap 50 close to two ends of the stator tooth part 1014 of the stator iron core 101 is large.

Magnetization manners of the first permanent magnet 201 and the second permanent magnet 301 are parallel magnetization, and a magnetization direction is perpendicular to a slot surface at a corresponding location of the U-shaped cavity, and is the same as a thickness direction (a direction of a minimum size) of magnetic steel. Magnetization directions of the first permanent magnets 201 on the two wings of the U-shaped cavity are the same, and magnetization directions of the first permanent magnets 201 of adjacent U-shaped cavities are opposite. A size and a direction of the second permanent magnet 301 are adjusted based on a requirement.

Figure 3:
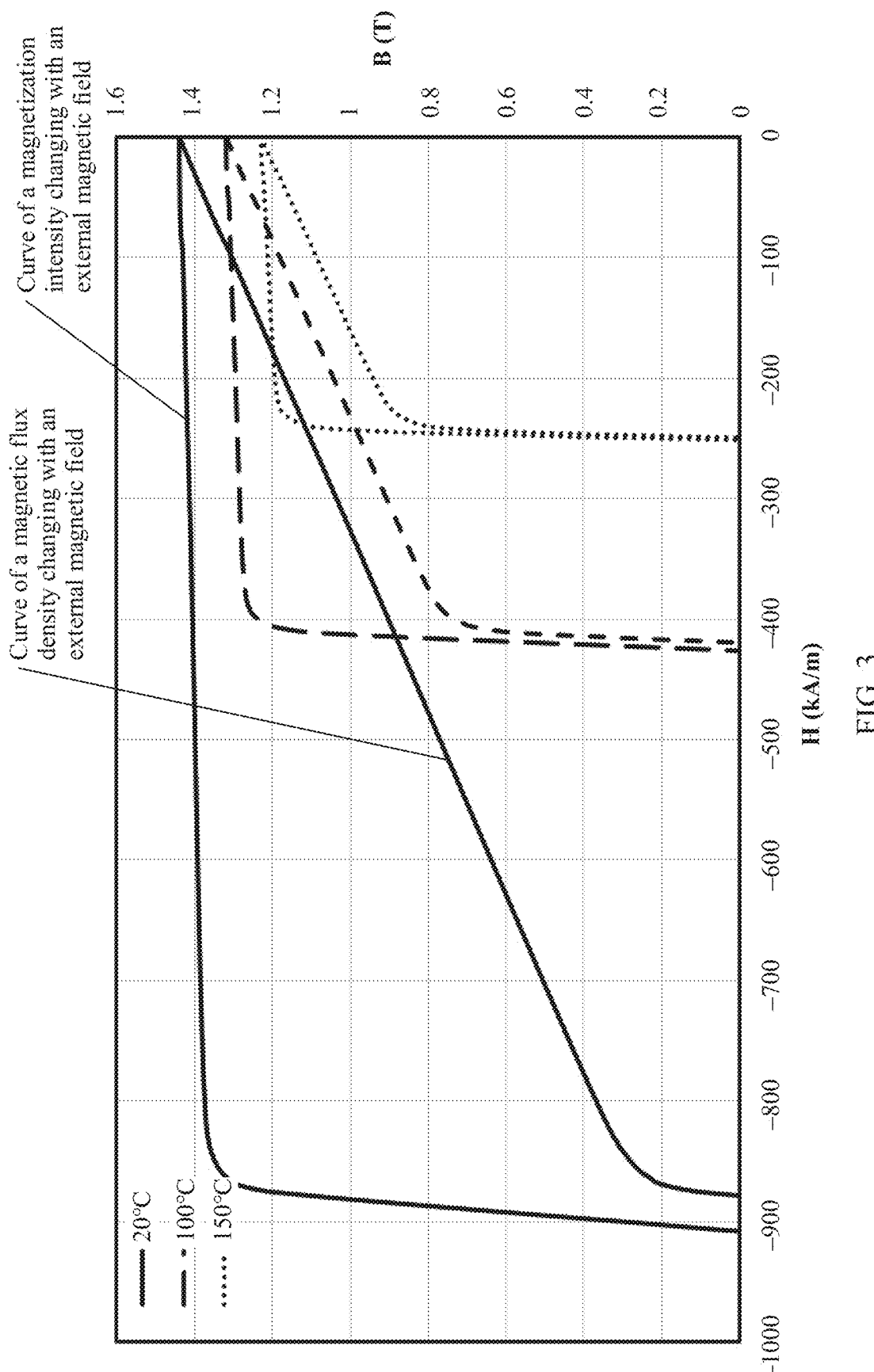
FIG. 3 is a schematic diagram of demagnetization curves of a second permanent magnet at different temperatures according to an embodiment of this application.

In this implementation, a highest operating temperature of the motor is designed to be 140° C., and a neodymium-iron-boron magnet with coercive force of 249.6 kA/m at 150° C. is selected as the second permanent magnet 301. FIG. 3 is a schematic diagram of demagnetization curves of the second permanent magnet 301 at different temperatures according to an embodiment of this application. There are two demagnetization curves corresponding to a same temperature: a curve (that is, a line M–H) of a magnetization intensity changing with an external magnetic field and a curve (that is, a line B-H) of a magnetic flux density changing with an external magnetic field, where $B=4\pi M+H$, M indicates the magnetization intensity, H indicates an intensity of the external magnetic field, and B indicates the magnetic flux density. For example, a remanence Br of the second permanent magnet 301 at a temperature of 20° C. is 1.44 T, the coercive force Hcj is 908 kA/m, and a maximum magnetic energy product (BH)m is 387 kJ/m³. A high remanence makes the second permanent magnet 301 have a wider range of flux adjustment, and the coercive force of less than 250 kA/m at 150° C. greatly reduces flux adjustment difficulty of the second permanent magnet 301.

In this embodiment, a ceramic heating plate with a thickness of 0.8 mm may be selected as a heat source of the second permanent magnet 301. A conducting wire connector of the heating plate is connected to an external power supply by using an electrical brush 60. A two-pole collector ring 204 at an end part of the motor rotor. FIG. 4 is a schematic diagram of a connection relationship between the collector ring 204 and the electrical brush 60 according to an embodiment of this application. A positive conducting wire 2021 and a negative conducting wire 2022 of the heating plate are connected to the collector ring 204 located at the end part of the motor rotor, and the collector ring 204 is connected to the external power supply through the electrical brush 60. When a power supply 70 is turned on, a current sends energy to the heating plate through the electrical brush 60 and the collector ring 204.

An operation principle of the variable flux motor shown in FIG. 1 is as follows: During magnetization enhancement operation, magnetization directions of the second permanent magnet 301 and the first permanent magnet 201 are the same. FIG. 7 is a schematic diagram of non-load magnetic field distribution of a variable flux permanent-magnet synchronous motor during magnetization enhancement operation according to an embodiment of this application. It should be noted that FIG. 1 and FIG. 7 show variable flux permanent-magnet synchronous motors of a same structure. Reference numerals of components in FIG. 7 are shown in FIG. 1, which are merely for description herein. Permanent magnetic flux starts from north poles of the first permanent magnet 201 and the second permanent magnet 301 of the U-shaped cavity, a part of the flux passes through the rotor iron core 202, passes through the air gap 50, reaches the stator tooth part 1014 of the "T"-shaped iron core on the stator, passes through the outer stator yoke 1013 of the stator iron core 101, passes through the air gap 50 from the stator tooth part 1014 of an adjacent "T"-shaped iron core, reaches south poles of the first permanent magnet 201 and the second permanent magnet 301 of an adjacent U-shaped cavity, then passes through a yoke part of the rotor iron core 202, and returns to south poles of the first permanent magnet 201 and the second permanent magnet 301 of the U-shaped cavity from which the flux starts, thereby implementing a magnetic loop. Because magnetization directions of the second permanent magnet 301 and the first permanent magnet 201 are the same, magnetic flux of the first permanent magnet 201 and the second permanent magnet 301 flow in a same direction after being superimposed.

Figure 8:
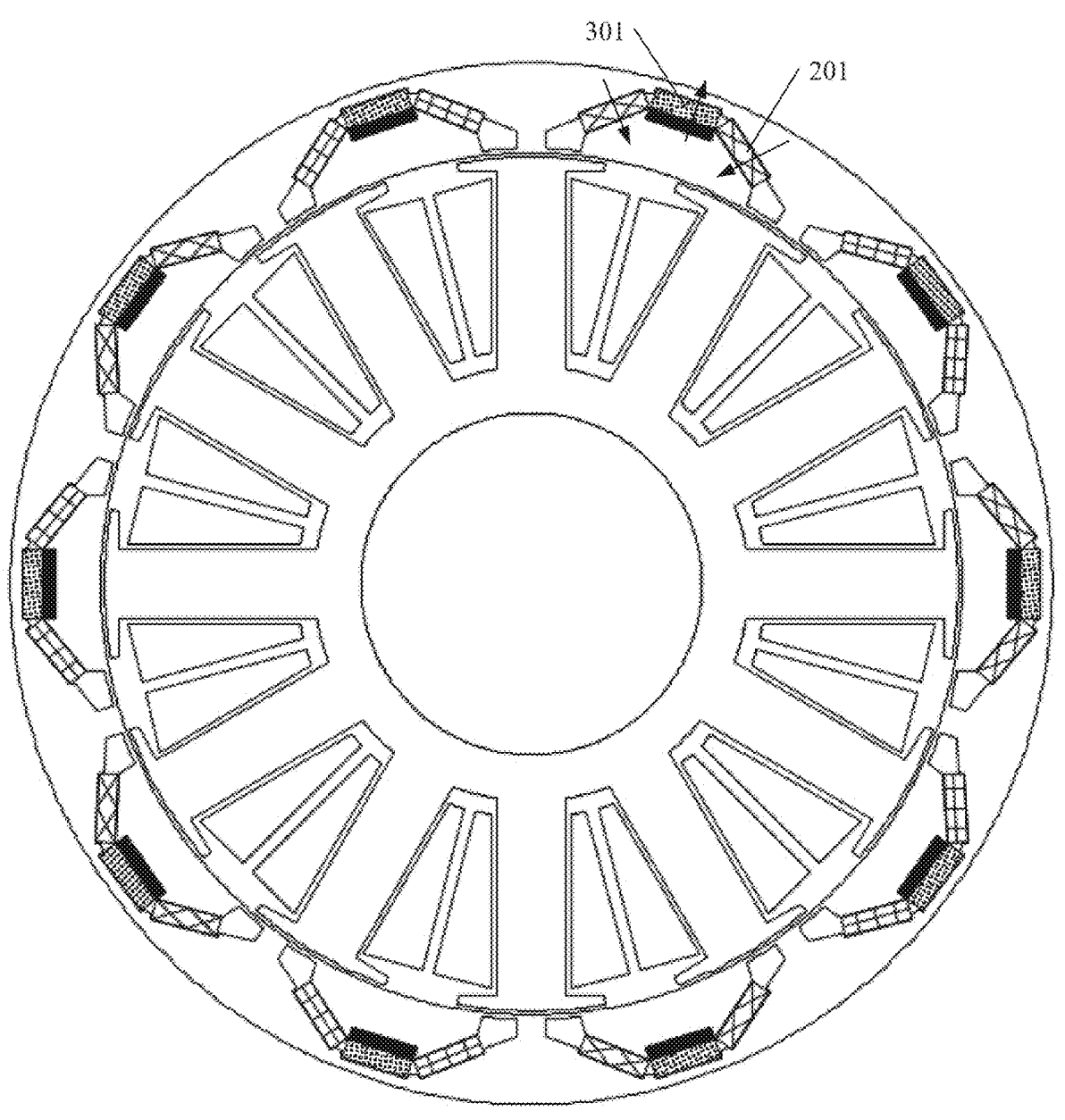
FIG. 8 is a schematic diagram of non-load magnetic field distribution of a variable flux permanent-magnet synchronous motor during magnetization weakening operation according to an embodiment of this application.

During magnetization weakening operation, the magnetization directions of the second permanent magnet 301 and the first permanent magnet 201 are opposite. FIG. 8 is a schematic diagram of non-load magnetic field distribution of a variable flux permanent-magnet synchronous motor during magnetization weakening operation according to an embodiment of this application. It should be noted that, FIG. 1 and FIG. 8 show variable flux permanent-magnet synchronous motors of a same structure. Reference numerals of components in FIG. 8 are shown in FIG. 1, which are merely for description herein. Permanent magnetic flux starts from a north pole of the first permanent magnet 201 of the U-shaped cavity, a part of the flux passes through the rotor iron core 202, passes through the air gap 50, reaches the stator tooth part 1014 of the "T"-shaped iron core on the stator, passes through the outer stator yoke 1013 of the stator iron core 101, passes through the air gap 50 from the stator tooth part 1014 of an adjacent "T"-shaped iron core, reaches a south pole of the first permanent magnet 201 of an adjacent U-shaped cavity, then passes through a yoke part of the rotor iron core 202, and returns to a south pole of the first permanent magnet 201 of the U-shaped cavity from which the flux starts. The other part of the flux starts from the north pole of the first permanent magnet 201 of the U-shaped cavity, passes through the rotor iron core 202, directly reaches a south pole of the second permanent magnet 301, then passes through the yoke part of the rotor iron core 202, and returns to the south pole of the first permanent magnet 201. A local magnetic loop is formed, so that most of the flux forms a short circuit inside the rotor.

A flux adjustment principle of the second permanent magnet 301 is as follows: An instantaneous current is input to the heating plate through the electrical brush 60, and a temperature of the second permanent magnet 301 rises to 150° C. within a short period of time (for example, duration is less than or equal to 10 s). At this time, the flux is adjusted instantly by applying a reasonable D-axis pulse current by using a stator winding. After the flux is adjusted, the current input of the heating plate stops, and the magnetic steel quickly drops to a normal operating temperature, and stable output of the flux is implemented. When the flux adjustment needs to be performed again, the foregoing actions are repeated.

Embodiment 2

A basic structure of the variable flux motor in this implementation is also a 12-slot 10-pole external rotor internal stator motor. FIG. 9 is a schematic diagram of a structure of another variable flux permanent-magnet synchronous motor according to an embodiment of this application. The structure of the variable flux motor includes a rotating shaft system 40, a stator system 10, a rotor system 20, and a variable magnet system 30 from inside to outside. Different from Embodiment 1, the variable magnet system 30 is located on the stator system 10. The rotor system 20 includes a rotor iron core 202, a U-shaped cavity on the rotor iron core 202, and a first permanent magnet 201 located in the U-shaped cavity. The first permanent magnet 201 is a permanent magnet with high coercive force. There are three first permanent magnets 201 of each magnetic pole, which are respectively located at two wings and the bottom of the U-shaped cavity. On two sides of the U-shaped cavity are magnetic isolation bridges 203. Inward the rotor system 20 is the stator system 10 with an air gap 50 located between an inner surface of the rotor iron core 202 and an outer surface of a stator iron core 101.

The stator system 10 includes several parts, which are respectively the stator iron core 101, an armature winding 102, a pulse flux adjustment winding, a second permanent magnet 30, and a heating plate. The stator iron core 101 is divided into two parts inside and outside. The outer iron core includes 12 "T" shapes, a stator tooth part 1014 of the stator iron core 101 is located on an outer side of the "T"-shaped stator iron core 101, and an outer stator yoke 1013 of the stator iron core 101 is located on an inner side of the "T"-shaped stator iron core 101. The "T"-shaped stator iron core 101 is evenly distributed around a circumference of the stator, and the armature winding 102 is located in a cavity (for example, referred to as a stator slot 1015) between adjacent "T"-shaped stator iron cores 101.

Inward the outer stator yoke 1013 of the stator iron core 101 are evenly distributed a circle of arc-shaped cavities, which are called inner stator slots 1012. The second permanent magnet 301 is evenly located in the inner stator slot 1012. The pulse flux adjustment winding is wound around the second permanent magnet 301, and is formed by connecting armature windings 102 of three phases head to tail in series, and flux adjustment is performed on the second permanent magnet 301 at a high temperature by using the pulse flux adjustment winding. The heating plate is located in a gap of an inner surface of the second permanent magnet 301, and is in close contact with the second permanent magnet 301 to provide a heating temperature for the second permanent magnet 301. Inward the stator iron core 101 is a rotating shaft of the motor, and the stator iron core 101 is located on a shaft sleeve of the rotating shaft.

Magnetization manners of the first permanent magnet 201 and the second permanent magnet 301 are parallel magnetization, and a magnetization direction is perpendicular to a slot surface at a corresponding location of the U-shaped cavity, and is the same as a thickness direction (a direction of a minimum size) of magnetic steel. Magnetization directions of the first permanent magnets 201 on the two wings of the U-shaped cavity are the same, and magnetization directions of the first permanent magnets 201 of adjacent U-shaped cavities are opposite. A quantity of second permanent magnets 301 is the same as a quantity of stator slots 1015. The magnetization direction of the second permanent magnets 301 changes along a circumference at a period of 2, magnetization directions of two adjacent second permanent magnets 301 are the same, and magnetization directions of two second permanent magnets 301 spaced apart by one second permanent magnet 301 are opposite, as shown by permanent magnets of different shapes in slots in the stator iron core 101 in FIG. 9. A size and a direction of the second permanent magnet 301 may be adjusted based on a requirement.

A highest operating temperature of the motor in this implementation may also be set to 140° C., and the neodymium-iron-boron magnet with the coercive force of 249.6 kA/m at 150° C. in Embodiment 1 is selected as the second permanent magnet 301.

An operation principle of the variable flux motor in Embodiment 2 is as follows: During magnetization enhancement operation, the magnetization direction of the second permanent magnet 301 is shown in FIG. 11, a schematic diagram of non-load magnetic field distribution of another variable flux permanent-magnet synchronous motor during magnetization enhancement operation according to an embodiment of this application. It should be noted that, FIG. 11 and FIG. 9 show variable flux permanent-magnet synchronous motors of a same structure. Reference numerals of components in FIG. 11 are shown in FIG. 9, which are merely for description herein. Magnetization directions of the second permanent magnets 301 of yoke parts of "T"-shaped iron cores 1 and 2 are outward, and magnetization directions of the second permanent magnets 301 of yoke parts of iron cores 3 and 4 are inward. Most of permanent magnetic flux starts from a north pole of the second permanent magnet 301 (the yoke part of the "T"-shaped iron core 2), passes through the "T"-shaped iron core 2, passes through the air gap 50 and the rotor iron core 202 to reach a south pole of the first permanent magnet 201 of the U-shaped cavity, then starts from a north pole of the first permanent magnet 201 of the U-shaped cavity, then passes through a yoke part of the rotor iron core 202, passes through the first permanent magnet 201 of an adjacent U-shaped cavity, passes through the rotor iron core 202, passes through the air gap 50 to reach the stator tooth part 1014 of an adjacent "T"-shaped iron core 3, passes through the stator iron core 101 to reach a south pole (the yoke part of the "T"-shaped iron core 3) of an adjacent second permanent magnet 301 with an opposite orientation, and passes through an inner stator yoke 1011 to reach a south pole of the second permanent magnet 301 from which the flux starts, thereby implementing a magnetic loop. A small part of the flux of the second permanent magnet 301 is inside the stator iron core 101, and flux of the first permanent magnet 201 is inside the rotor iron core 202, thereby forming a local magnetic loop, such as the second permanent magnets 301 of the yoke part of the "T"-shaped iron core 4 and a yoke part of the "T"-shaped iron core 5. The flux starts from a north pole of the permanent magnet of the yoke part of the "T"-shaped iron core 4, passes through the inner stator yoke 1011, reaches a south pole of the permanent magnet of the yoke part of the "T"-shaped iron core 5, then starts from a north pole of the permanent magnet of the yoke part of the "T"-shaped iron core 5, passes through the inner stator yoke 1011, and returns to a south pole of the permanent magnet of the yoke part of the "T"-shaped iron core 4. Because magnetization directions of most of the second permanent magnets 301 are connected in series with the magnetization direction of the first permanent magnet 201, in the variable flux motor as a whole, the magnetic flux of the first permanent magnet 201 and the second permanent magnet 301 flow in a same direction after being superimposed.

Figure 12:
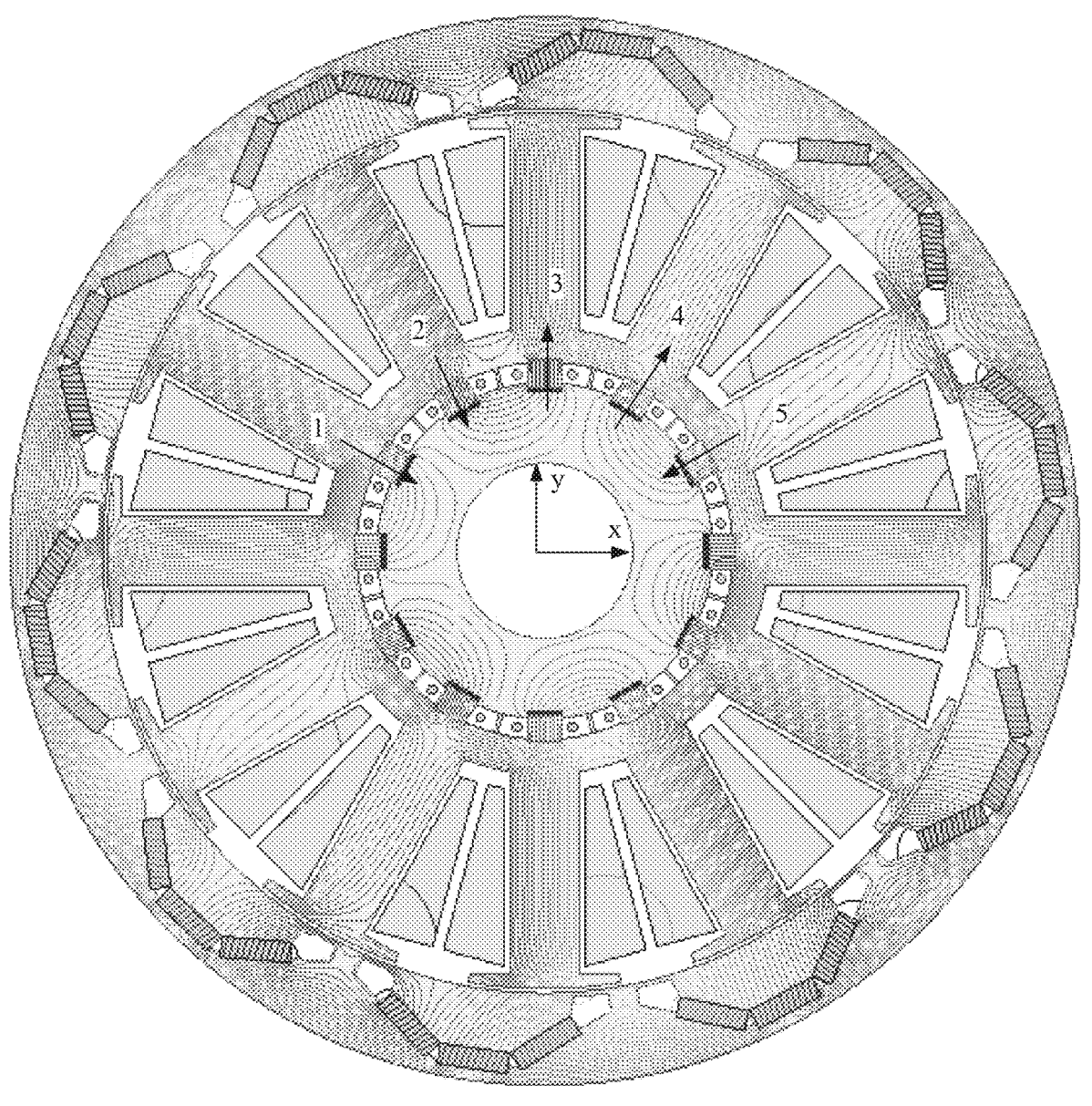
FIG. 12 is a schematic diagram of non-load magnetic field distribution of another variable flux permanent-magnet synchronous motor during magnetization weakening operation according to an embodiment of this application.

During magnetization weakening operation, the magnetization direction of the second permanent magnet 301 is shown in FIG. 12, a schematic diagram of non-load magnetic field distribution of another variable flux permanent-magnet synchronous motor during magnetization weakening operation according to an embodiment of this application. It should be noted that, FIG. 12 and FIG. 9 show variable flux permanent-magnet synchronous motors of a same structure. Reference numerals of components in FIG. 12 are shown in FIG. 9, which are merely for description herein. Magnetization directions of the second permanent magnets 301 of yoke parts of "T"-shaped iron cores 1 and 2 are inward, and magnetization directions of the second permanent magnets 301 of yoke parts of iron cores 3 and 4 are outward. Most of flux of the second permanent magnet 301 is inside the stator iron core 101, and flux of the first permanent magnet 201 is inside the rotor iron core 202, thereby forming a local magnetic loop, such as the second permanent magnets 301 of the yoke parts of the "T"-shaped iron cores 3 and 2. The flux starts from a north pole of the permanent magnet of the yoke part of the "T"-shaped iron core 3, passes through the inner stator yoke 1011, reaches a south pole of the permanent magnet of the yoke part of the "T"-shaped iron core 2, then starts from a north pole of the permanent magnet of the yoke part of the "T"-shaped iron core 2, passes through the inner stator yoke 1011, and returns to a south pole of the permanent magnet of the yoke part of the "T"-shaped iron core 3. A small part of the permanent magnetic flux starts from a north pole of the second permanent magnet 301 (the yoke part of the "T"-shaped iron core 4), passes through the "T"-shaped iron core 4, passes through the air gap 50 and the rotor iron core 202 to reach a south pole of the first permanent magnet 201 of the U-shaped cavity, then starts from a north pole of the first permanent magnet 201 of the U-shaped cavity, then passes through the yoke part of the rotor iron core 202, passes through the first permanent magnet 201 of an adjacent U-shaped cavity, passes through the rotor iron core 202, passes through the air gap 50 to reach the stator tooth part 1014 of an adjacent "T"-shaped iron core 5, passes through the stator iron core 101 to reach a south pole (a yoke part of the "T"-shaped iron core 5) of an adjacent second permanent magnet 301 with an opposite orientation, and passes through the inner stator yoke 1011 to reach a south pole of the second permanent magnet 301 from which the flux starts, thereby implementing a magnetic loop. Because most of the flux of the second permanent magnets 301 is short-circuited inside the stator iron core 101, the magnetic flux of the first permanent magnet 201 and the second permanent magnet 301 cannot be superimposed or even repel each other, thereby implementing demagnetization operation of the motor.

A flux adjustment principle of the second permanent magnet 301 is as follows: An instantaneous current is input to the heating plate by using a power supply, and a temperature of the second permanent magnet 301 rises to 150° C. within a short period of time (for example, duration is less than or equal to 10 s). At this time, the flux is adjusted instantly by using the pulse flux adjustment winding in the inner stator yoke 1011. After the flux is adjusted, the current input of the heating plate stops, the magnetic steel quickly drops to a normal operating temperature, and stable output of the flux is implemented. When the flux adjustment needs to be performed again, the foregoing actions are repeated.

It can be learned from the foregoing examples that, in this embodiment of this application, the heating plate is disposed to assist the variable flux of the magnet with the low coercive force, so that flux adjustment difficulty is reduced, and a range of permanent magnetic materials that can be selected as a variable flux magnet is expanded. According to the variable flux structure in this embodiment of this application, the neodymium iron boron can be used as the variable flux magnet. The neodymium iron boron has a high remanence. Therefore, a range of speed adjustment is greatly increased and a torque density of the variable flux motor is ensured. A feature that a coercive force temperature coefficient of the neodymium iron boron is large is used, so that in this embodiment of this application, magnetization enhancement or demagnetization is performed on the neodymium iron boron after a temperature of the neodymium iron boron is increased, and the flux adjustment difficulty is reduced. In this embodiment of this application, a temperature rise and the flux adjustment are instantaneous processes, and the coercive force of the magnet obviously increases after the temperature is lowered, which can effectively prevent occurrence of accidental demagnetization when the motor operates. In this embodiment of this application, the neodymium iron boron with the low coercive force, for example, neodymium iron boron containing Ce, may be used as the variable flux magnet. The variable flux magnet has rich resources and low costs. This expands an application scope of this type of magnet and use of rare earth elements such as La and Ce is reduced, thereby reducing production costs of the motor.

An embodiment of this application further provides a powertrain. The powertrain includes a transmission, a micro control unit, and the variable flux permanent-magnet synchronous motor described in any one of FIG. 1, FIG. 2, FIG. 7 to FIG. 9, and FIG. 11 and FIG. 12. The variable flux permanent-magnet synchronous motor in the powertrain includes a stator system 10, a rotor system 20, and a variable magnet system 30. The variable magnet system 30 is located in the stator system 10 or the rotor system 20. The rotor system 20 includes a first permanent magnet 201. The variable magnet system 30 includes a second permanent magnet 301 and a heating apparatus 302. Coercive force of the second permanent magnet 301 is lower than coercive force of the first permanent magnet 201. The heating apparatus 302 is configured to heat the second permanent magnet 301, so that the second permanent magnet 301 has variable flux in a magnetic field.

In the foregoing solution, in the variable flux permanent-magnet synchronous motor, the rotor system 20 includes the first permanent magnet 201, and the variable magnet system 30 includes the second permanent magnet 301. The two permanent magnets have different coercive force, and the second permanent magnet 301 is heated by using the heating apparatus 302. The heating apparatus 302 may assist the second permanent magnet 301 in implementing the variable flux in the magnetic field. In the variable flux permanent-magnet synchronous motor, the heating apparatus 302 heats the second permanent magnet 301, so that a temperature of the second permanent magnet 301 rises. This can reduce flux adjustment difficulty of the second permanent magnet 301 and expand a range of permanent magnetic materials that can be selected as a variable flux magnet.

An embodiment of this application further provides a fan. The fan includes an impeller, a micro control unit, and the variable flux permanent-magnet synchronous motor described in any one of FIG. 1, FIG. 2, FIG. 7 to FIG. 9, and FIG. 11 and FIG. 12. The variable flux permanent-magnet synchronous motor in the fan includes a stator system 10, a rotor system 20, and a variable magnet system 30. The variable magnet system 30 is located in the stator system 10 or the rotor system 20. The rotor system 20 includes a first permanent magnet 201. The variable magnet system 30 includes a second permanent magnet 301 and a heating apparatus 302. Coercive force of the second permanent magnet 301 is lower than coercive force of the first permanent magnet 201. The heating apparatus 302 is configured to heat the second permanent magnet 301, so that the second permanent magnet 301 has variable flux in a magnetic field.

In the foregoing solution, in the variable flux permanent-magnet synchronous motor, the rotor system 20 includes the first permanent magnet 201, and the variable magnet system 30 includes the second permanent magnet 301. The two permanent magnets have different coercive force, and the second permanent magnet 301 is heated by using the heating apparatus 302. The heating apparatus 302 may assist the second permanent magnet 301 in implementing the variable flux in the magnetic field. In the variable flux permanent-magnet synchronous motor, the heating apparatus 302 heats the second permanent magnet 301, so that a temperature of the second permanent magnet 301 rises. This can reduce flux adjustment difficulty of the second permanent magnet 301 and expand a range of permanent magnetic materials that can be selected as a variable flux magnet.

It should be noted that embodiments described in this specification all belong to embodiments, and the involved modules are not necessarily required by this application.

In addition, it should be noted that the described apparatus embodiment is merely an example. The units described as separate components may or may not be physically separate, and components displayed as units may or may not be physical units, may be located in one position, or may be distributed on a plurality of units. Some or all of the modules may be selected based on actual requirements to achieve the objectives of the solutions of embodiments. In addition, in the accompanying drawings of the apparatus embodiments provided by this application, connection relationships between the modules indicate that the modules have connections with each other.

What is claimed is:

1. A variable flux permanent-magnet synchronous motor, comprising: a stator system (10), a rotor system (20), and a variable magnet system (30), wherein the variable magnet system (30) is located in the stator system (10) or the rotor system (20);

the rotor system (20) comprises a first permanent magnet (201) having first coercive force;

the variable magnet system (30) comprises a second permanent magnet (301) having second coercive force and a heating apparatus (302), wherein the second coercive force of the second permanent magnet (301) is lower than the first coercive force of the first permanent magnet (201), the heating apparatus (302) is configured to heat the second permanent magnet (301), so that the second permanent magnet (301) has variable flux in a magnetic field;

wherein the rotor system (20) comprises a rotor iron core (202) and the first permanent magnet (201) is located on the rotor iron core (202); and the second permanent magnet (301) and the heating apparatus (302) are both located on the rotor iron core (202) or a stator iron core (101) included in the stator system (10).

2. The variable flux permanent-magnet synchronous motor of claim 1, wherein a quantity of second permanent magnets (301) is the same as a quantity of heating apparatuses (302), and the second permanent magnets (301) one-to-one correspond to the heating apparatuses (302).

3. The variable flux permanent-magnet synchronous motor of claim 1, further comprising a controller configured to control a temperature that the heating apparatus (302) needs to reach and time required to reach the temperature.

4. The variable flux permanent-magnet synchronous motor of claim 3, wherein the controller is configured to input a current to the heating apparatus (302) within the time, so that the heating apparatus (302) reaches the temperature within the time.

5. The variable flux permanent-magnet synchronous motor of claim 1, wherein the heating apparatus (302) comprises a heating plate (302), and the rotor iron core (202) has a U-shaped cavity disposed thereon;

wherienwherein the U-shaped cavity comprises a wing part (2021) and a bottom part (2022);

the first permanent magnet (201) is located at the wing part (2021);

the second permanent magnet (301) is located at the bottom part (2022); and the heating plate (302) is located on a side that is of the second permanent magnet (301) and that is close to an opening of the U-shaped cavity.

6. The variable flux permanent-magnet synchronous motor of claim 1, wherein the heating apparatus (302) comprises a heating plate (302), and the rotor iron core (202) has a U-shaped cavity disposed thereon;

wherein the first permanent magnet (201) is located in the U-shaped cavity;

the stator iron core (101) comprises an outer stator yoke (1013) having an inner slot (10131), and the second permanent magnet (301) is located in the inner slot (10131); and an inner surface of the second permanent magnet (301) has a gap, the heating plate (302) is located in the gap, and the heating plate (302) is in contact with the second permanent magnet (301).

7. The variable flux permanent-magnet synchronous motor of claim 6, wherein the variable magnet system (30) comprises a single-phase pulse winding (303) located in the inner slot (10131);

wherein the single-phase pulse winding (303) is adjacent to the second permanent magnet (301); and the flux of the second permanent magnet (301) is adjusted based on a magnetic field generated by a current applied to the single-phase pulse winding (303).

8. The variable flux permanent-magnet synchronous motor of claim 1, wherein the stator system (10) comprises a stator iron core (101) and an armature winding (102);

the armature winding (102) is located on the stator iron core (101); and the flux of the second permanent magnet (301) is adjusted based on a magnetic field generated by a D-axis current, wherein duration for which the D-axis current is applied to the armature winding (102) is less than a preset duration threshold.

9. The variable flux permanent-magnet synchronous motor of claim 1, further comprising an electrical brush (60) and a power supply (70), wherein the rotor system (20) comprises a collector ring (204) connected to an end part of the rotor iron core (202);

wherein the heating apparatus (302) comprises a conducting wire connector connected to the collector ring (204); and wherein the power supply (70) is connected to the collector ring (204) through the electrical brush (60) and outputs a current to the heating apparatus (302) through the electrical brush (60) and the collector ring (204), so that the heating apparatus (302) heats the second permanent magnet (301).

10. The variable flux permanent-magnet synchronous motor of claim 1, further comprising a power supply (70) and a rotating transformer (80), wherein the rotating transformer (80) comprises a rotor winding (801) and a stator winding (802), the rotor winding (801) connected to an end part of the rotor iron core (202), and the stator winding (802) is connected to the power supply (70);

wherein the heating apparatus (302) comprises a conducting wire connector connected to the rotor winding (801); and wherein the power supply (70) outputs a current to the heating apparatus (302) by using the rotating transformer (80), so that the heating apparatus (302) heats the second permanent magnet (301).

11. The variable flux permanent-magnet synchronous motor of claim 1, comprising a power supply (70) connected to a conducting wire connector of the heating apparatus (302), the power supply (70) outputs a current to the heating apparatus (302), so that the heating apparatus (302) heats the second permanent magnet (301).

12. The variable flux permanent-magnet synchronous motor of claim 1, wherein a coercive force temperature coefficient of the second permanent magnet (301) is greater than or equal to-0.5%/K;

when a temperature of the second permanent magnet (301) is greater than or equal to a highest operating temperature of the variable flux permanent-magnet synchronous motor, the coercive force of the second permanent magnet (301) is greater than or equal to 150 kA/m and less than or equal to 300 kA/m; and K indicates Kelvin temperature and kA/m indicates kilo-amperes per meter.

13. The variable flux permanent-magnet synchronous motor of claim 1, wherein the second permanent magnet (301) is a neodymium-iron-boron (NdFeB) permanent magnet.

14. The variable flux permanent-magnet synchronous motor of claim 13, wherein the second permanent magnet (301) has a main alloy composition of $(Nd_{1-a}RE_a)_x Fe_{bal}B_y M_z$; and RE indicates a rare earth element, Nd indicates neodymium, Fe indicates Ferrum, B indicates boron, RE is one or more of lanthanum La, cerium Ce, yttrium Y, praseodymium Pr, holmium Ho, or gadolinium Gd, M is one or more of cobalt Co, cuprum Cu, niobium Nb, gallium Ga, aluminum Al, zinc Zn, nickel Ni, silicon Si, zirconium Zr, molybdenum Mo, vanadium V, and titanium Ti, a ranges from 0 to 1, x ranges from 15 wt % to 35 wt %, y ranges from 0.8 wt % to 1.2 wt %, z ranges from 0 wt % to 5 wt %, bal indicates a percentage by weight in which a remaining composition is Ferrum Fe, and wt % indicates a percentage by weight.

15. The variable flux permanent-magnet synchronous motor of claim 1, wherein a temperature at which the heating apparatus (302) is operable exceeds 200° C., and heating power of the heating apparatus (302) is greater than 1.5 w/cm²; and ° C. indicates degree Celsius and w/cm$^2$ indicates power per unit area.

16. The variable flux permanent-magnet synchronous motor of claim 1, wherein a thickness of the heating apparatus (302) is greater than or equal to 0.1 mm and less than or equal to 10 mm; and mm indicates millimeter.

* * * * *